(12) United States Patent
Hamilton et al.

(10) Patent No.: US 7,114,614 B2
(45) Date of Patent: Oct. 3, 2006

(54) MAGNETIC CENTERGUIDE

(75) Inventors: John M. Hamilton, Goldsboro, NC (US); Ramanathan Ravindran, Dallas, TX (US); Mark S. Hittle, Goldsboro, NC (US)

(73) Assignee: Turkington APV USA, LLC, Goldsboro, NC (US)

( * ) Notice: Subject to any disclaimer, the term of this patent is extended or adjusted under 35 U.S.C. 154(b) by 0 days.

(21) Appl. No.: 10/464,101

(22) Filed: Jun. 18, 2003

(65) Prior Publication Data

US 2004/0256201 A1 Dec. 23, 2004

(51) Int. Cl.
*B65G 15/46* (2006.01)

(52) U.S. Cl. .................. 198/803.6; 198/690.1

(58) Field of Classification Search ............ 198/690.1, 198/867.04, 803.6
See application file for complete search history.

(56) References Cited

U.S. PATENT DOCUMENTS

| | | | |
|---|---|---|---|
| 3,109,532 A * | 11/1963 | Milan ...................... | 198/690.1 |
| 3,871,510 A | 3/1975 | Homeier | |
| 4,586,601 A | 5/1986 | Hodlewsky | |
| 4,729,470 A | 3/1988 | Bacigalupe et al. | |
| 4,760,911 A | 8/1988 | Bacigalupe et al. | |
| 4,836,360 A | 6/1989 | Kasik | |
| 4,972,941 A | 11/1990 | Kasik | |
| 5,056,654 A | 10/1991 | Kasik | |
| 5,115,905 A | 5/1992 | Hollinger, II | |
| 5,147,033 A | 9/1992 | Kasik | |
| 5,188,216 A | 2/1993 | Smith et al. | |
| 5,579,897 A | 12/1996 | Kasik | |
| 5,649,619 A | 7/1997 | Kasik | |
| 5,871,084 A | 2/1999 | Kasik | |

FOREIGN PATENT DOCUMENTS

JP           53-124861        * 10/1978

\* cited by examiner

*Primary Examiner*—James R. Bidwell
(74) *Attorney, Agent, or Firm*—Womble Carlyle Sandridge & Rice, PLLC

(57) ABSTRACT

A magnetic centerguide for a grid structured for travel along the path of a conveyor. The grid defines a support surface that supports a pan. The guide generally comprises a magnet-carrying guide member mounted to the grid, normally but not necessarily on the grid centerline, and adjustable in a vertical direction relative to the support surface. The guide functions with numerous types of pans having different configurations of dough-carrying pockets and inter-pocket gaps. The guide member automatically adjusts its vertical position to contact the underside of the pan under a pocket or in an inter-pocket gap.

70 Claims, 26 Drawing Sheets

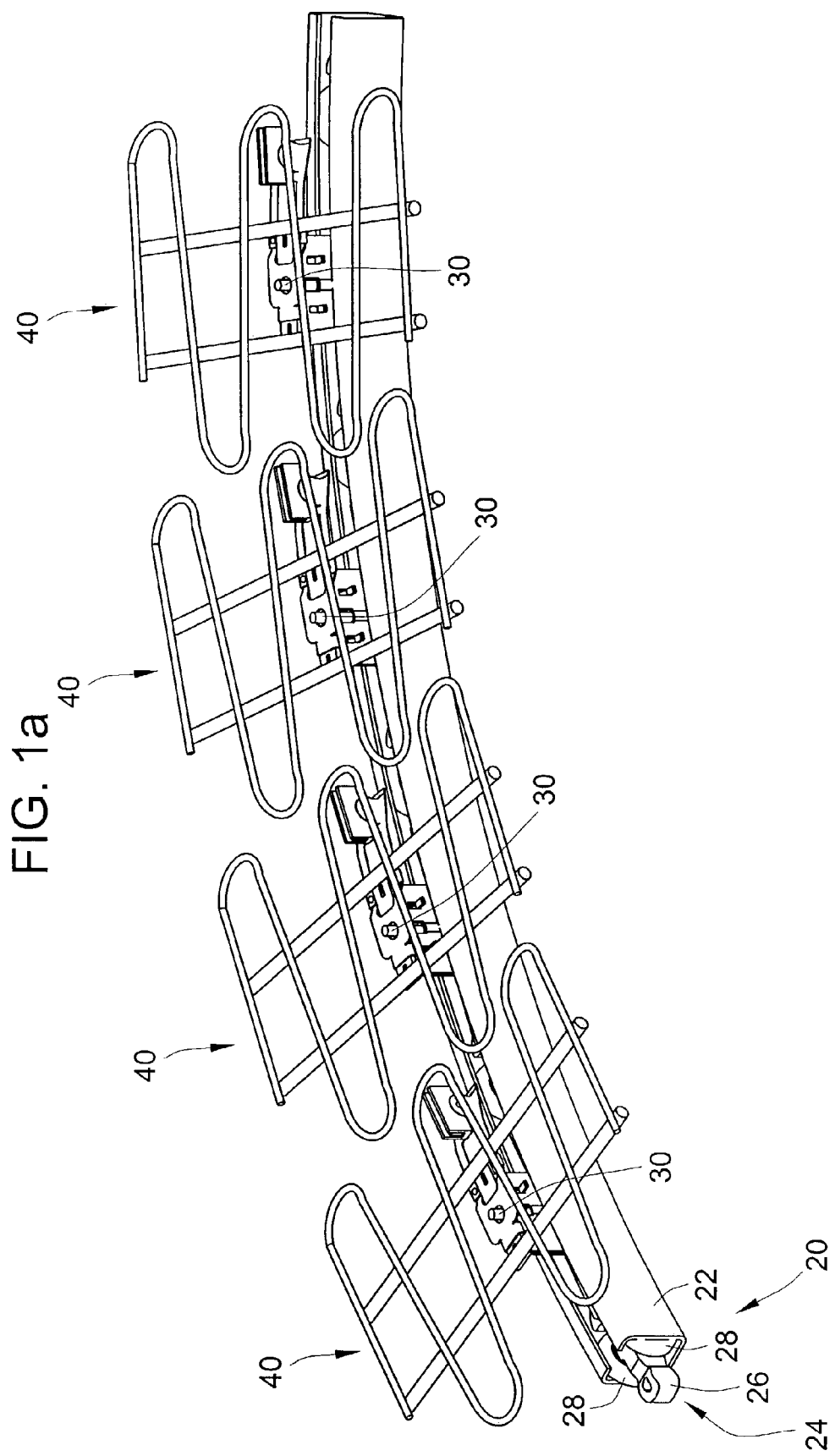

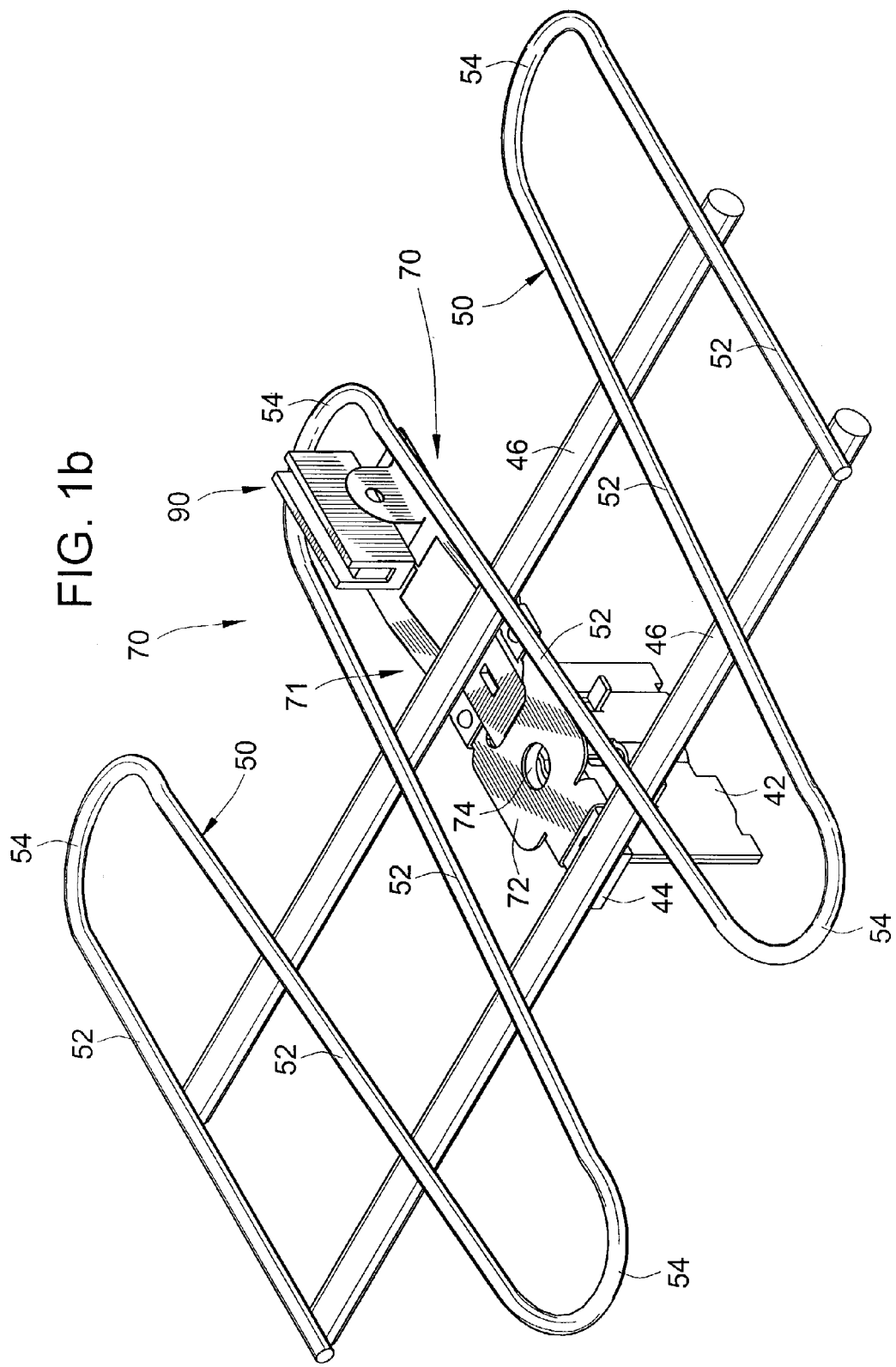

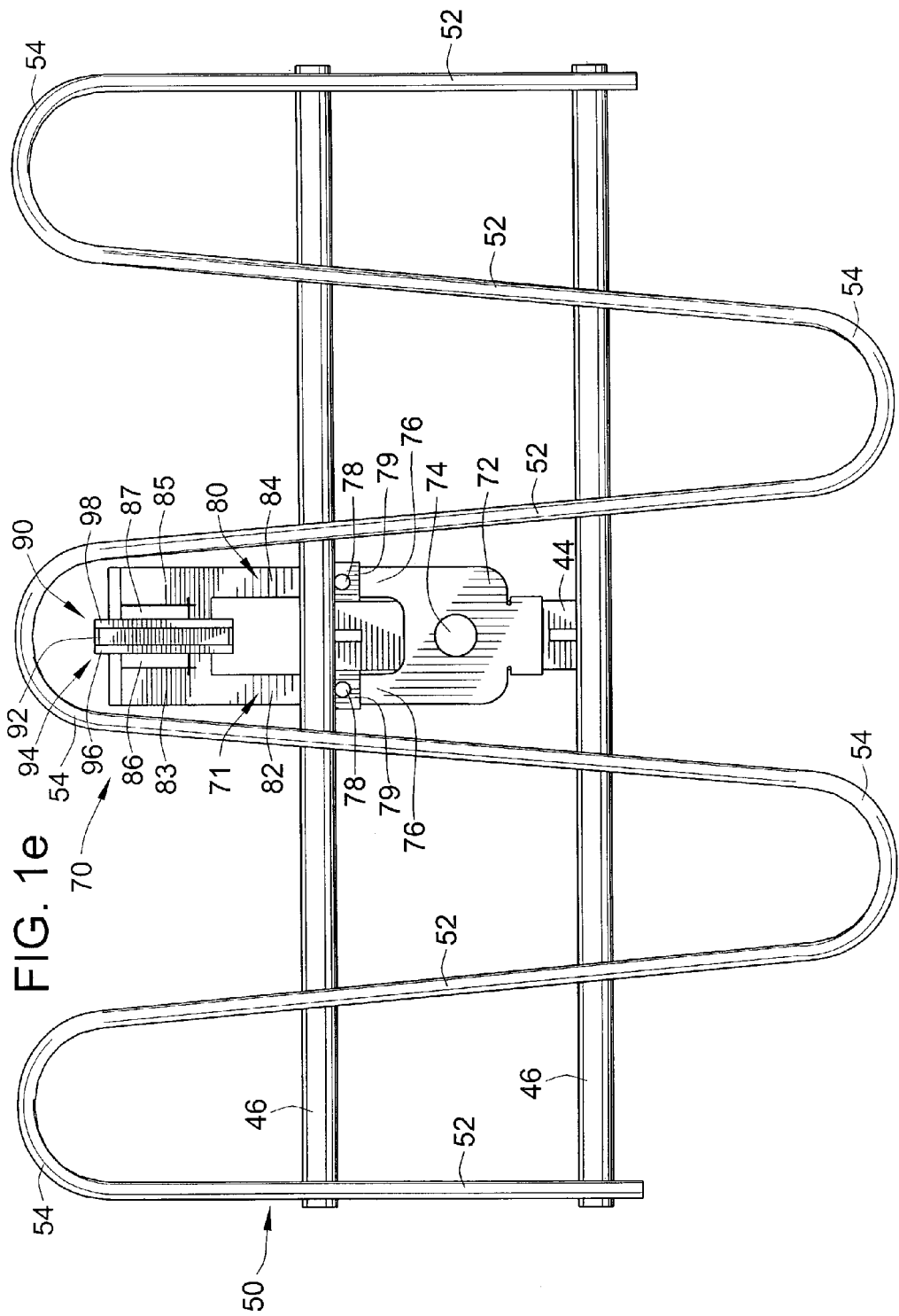

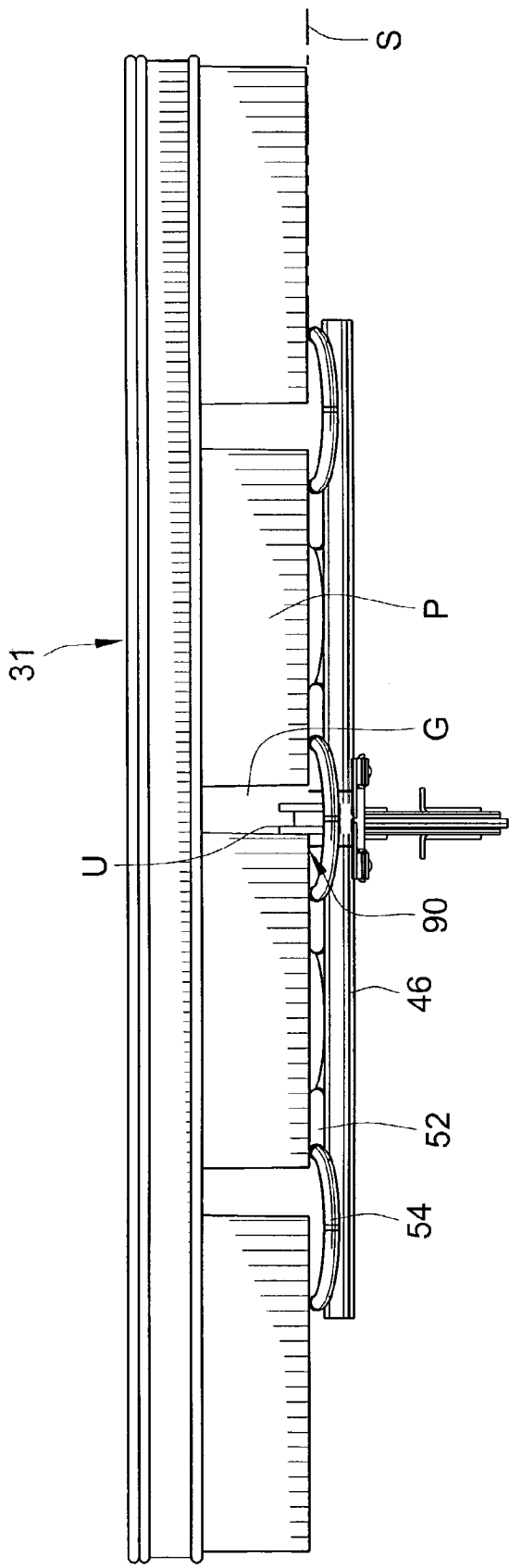

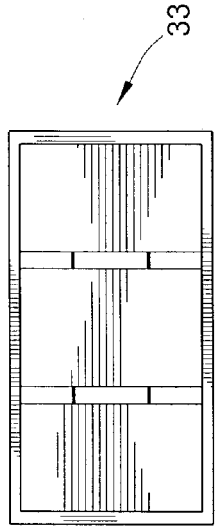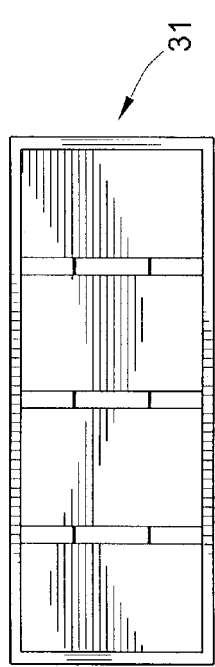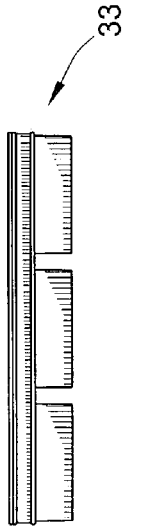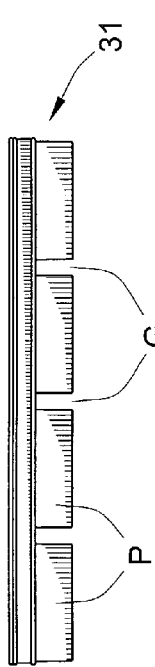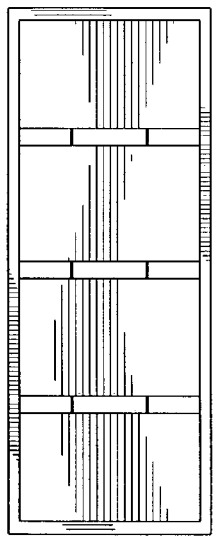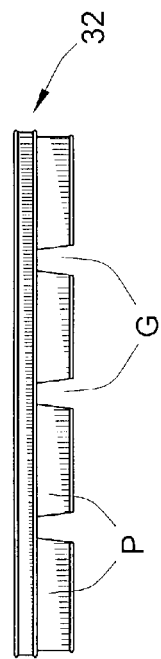

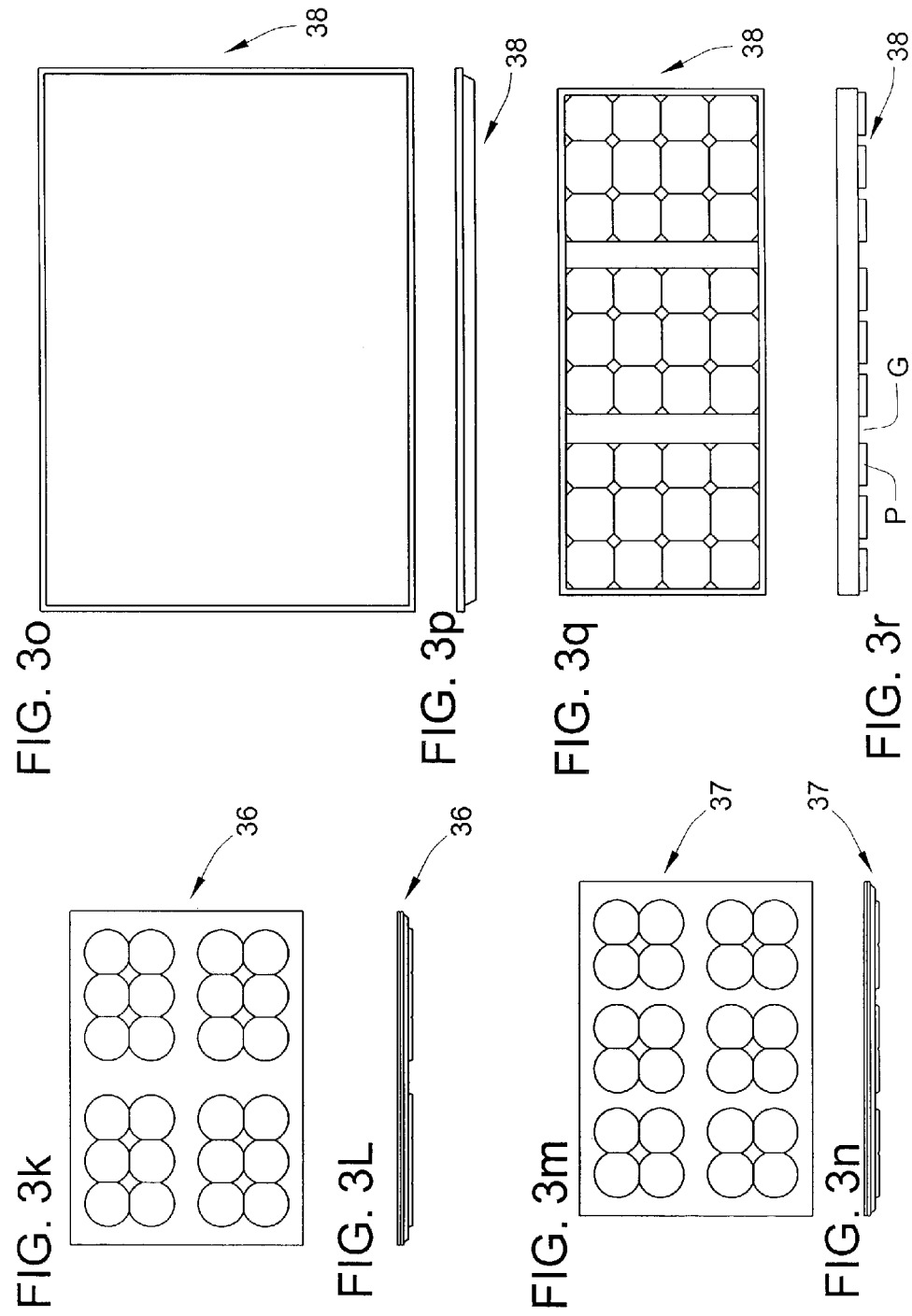

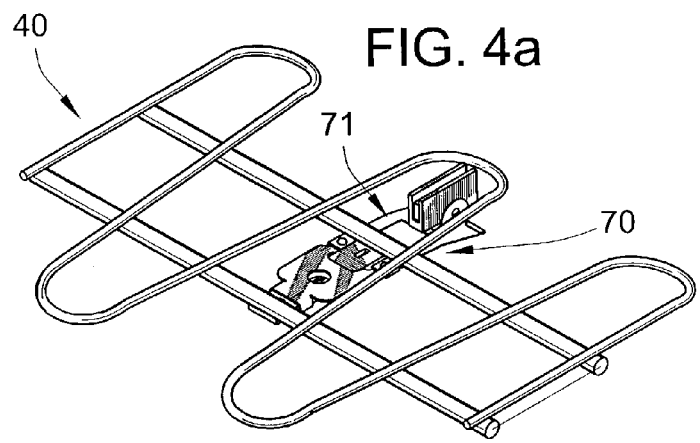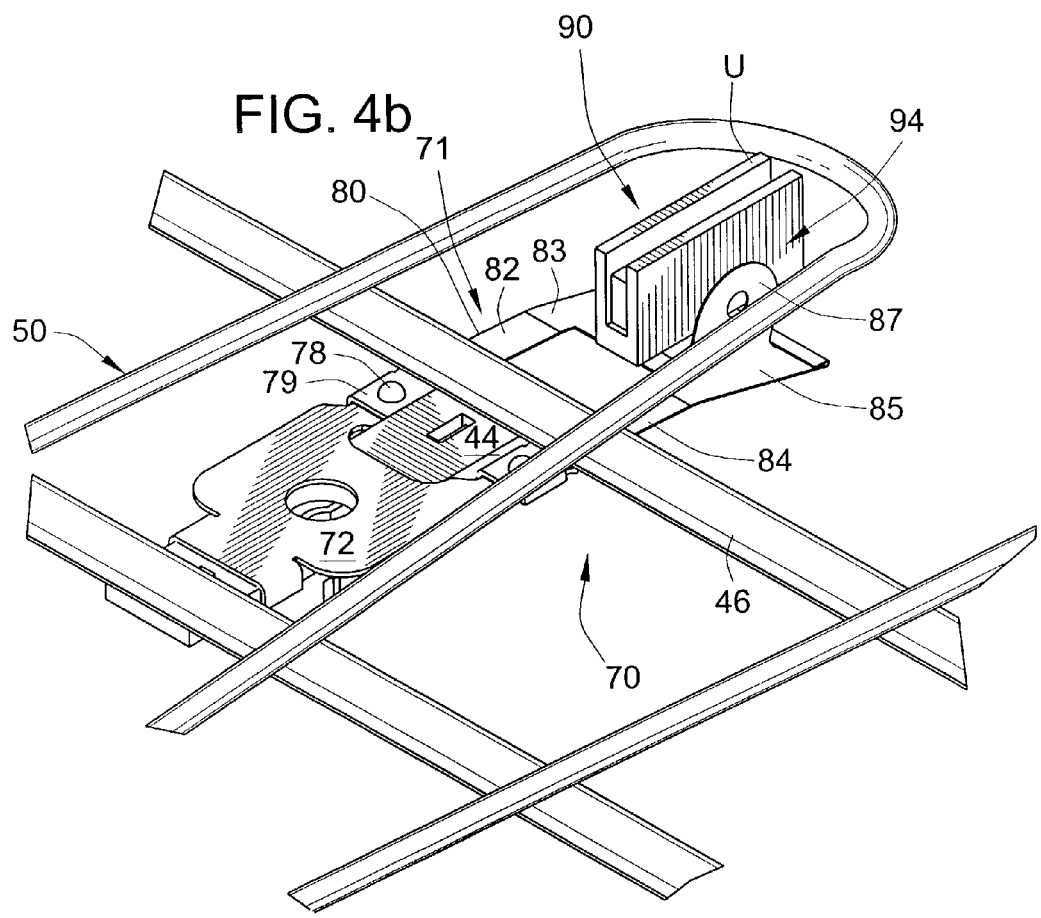

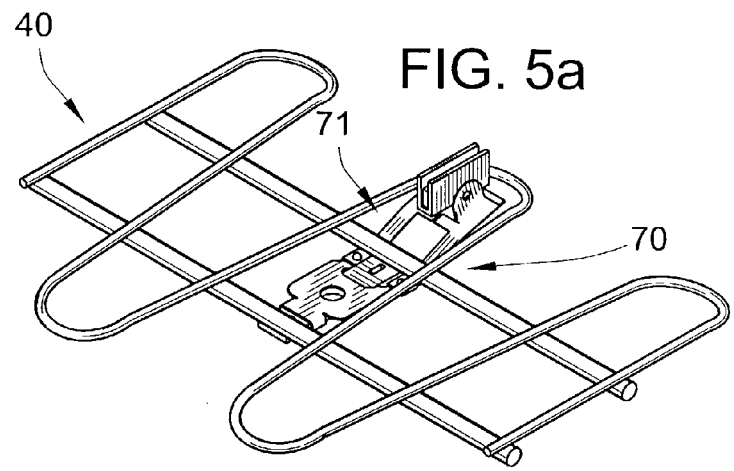
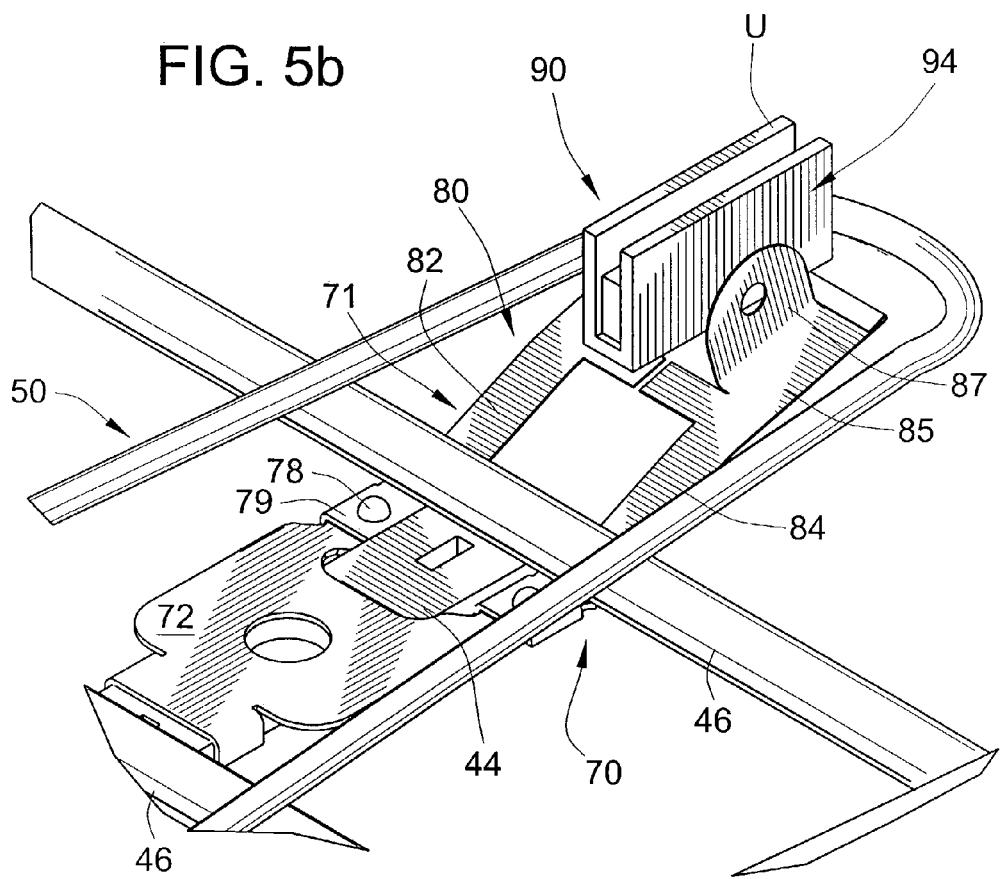

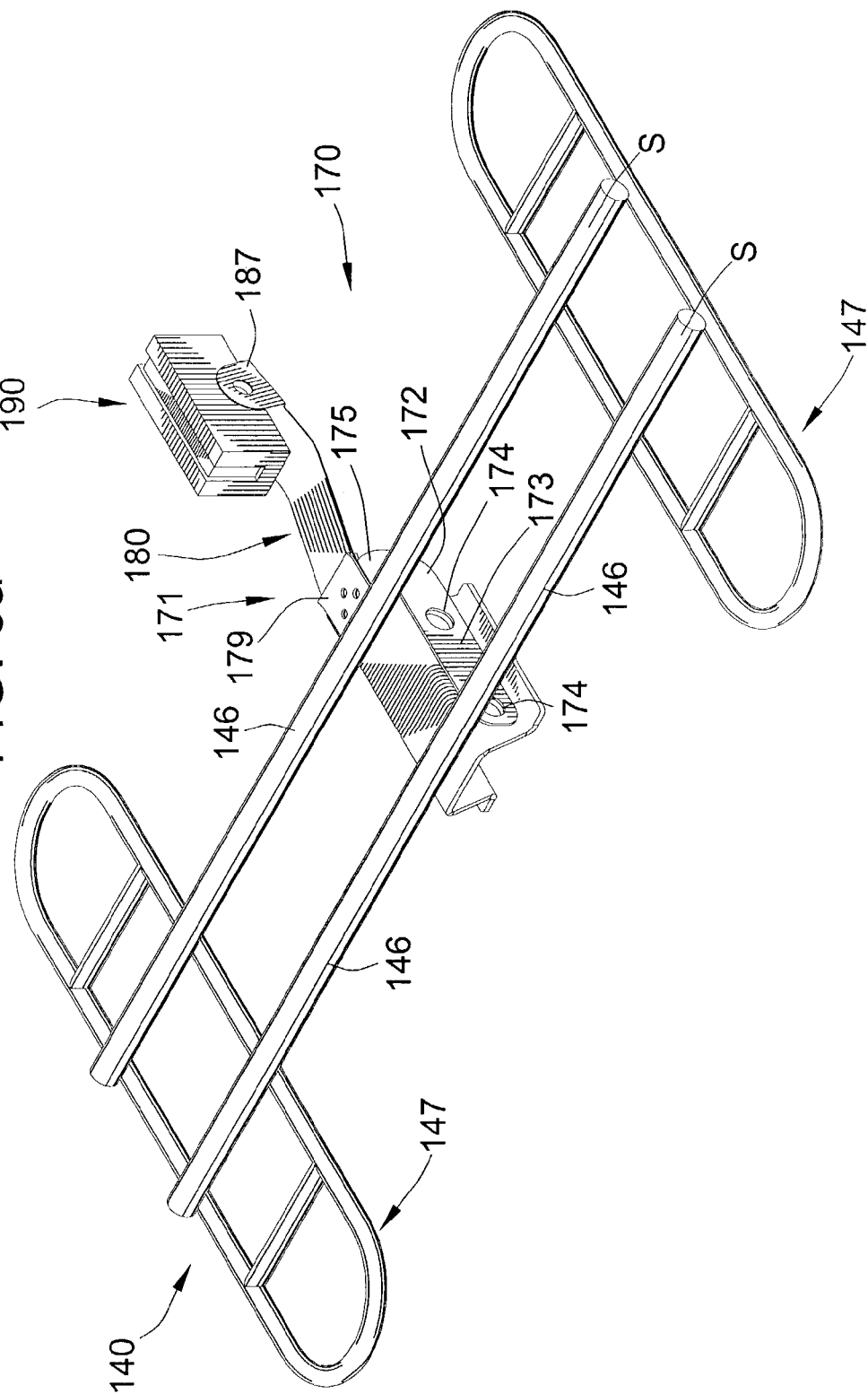

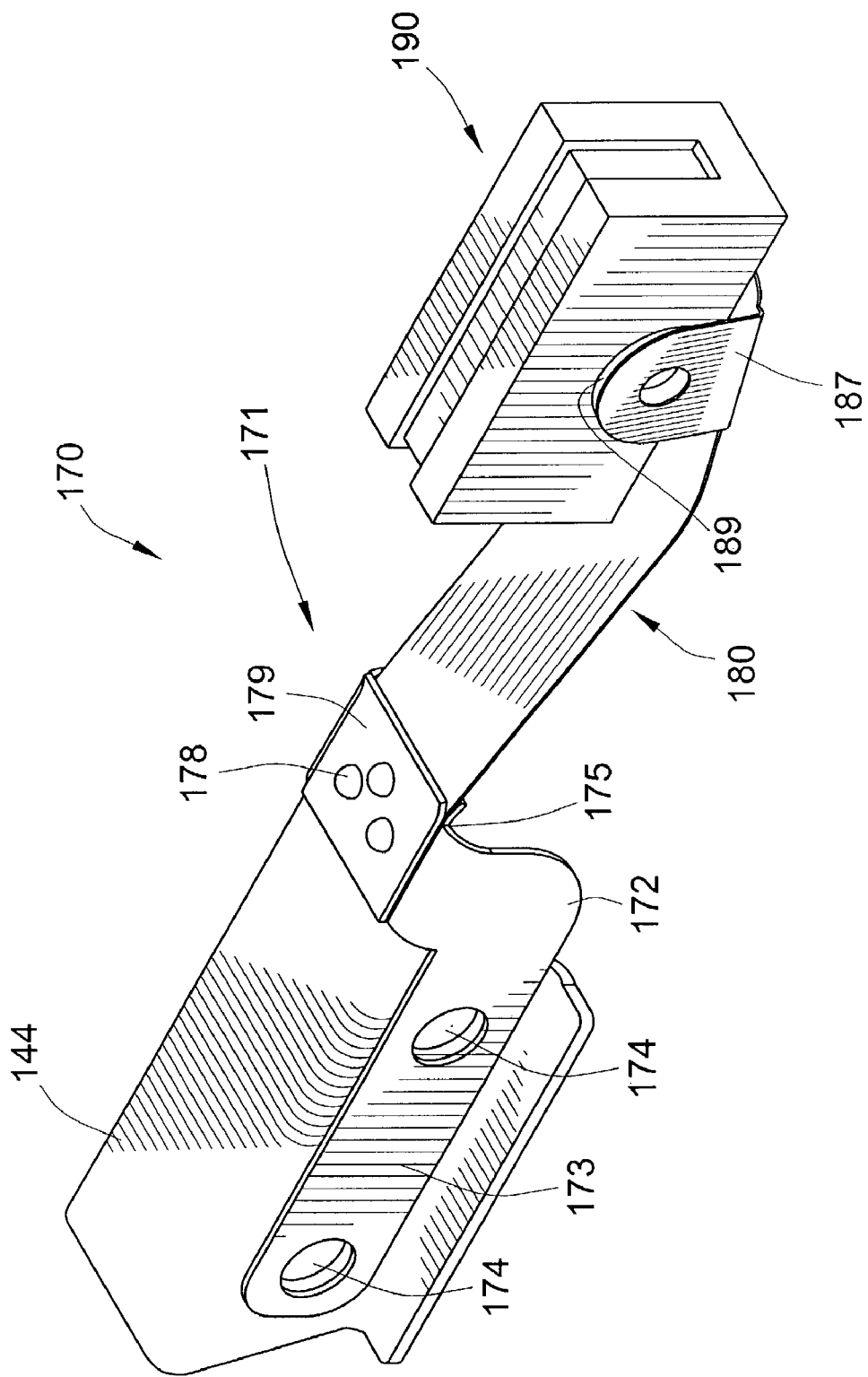

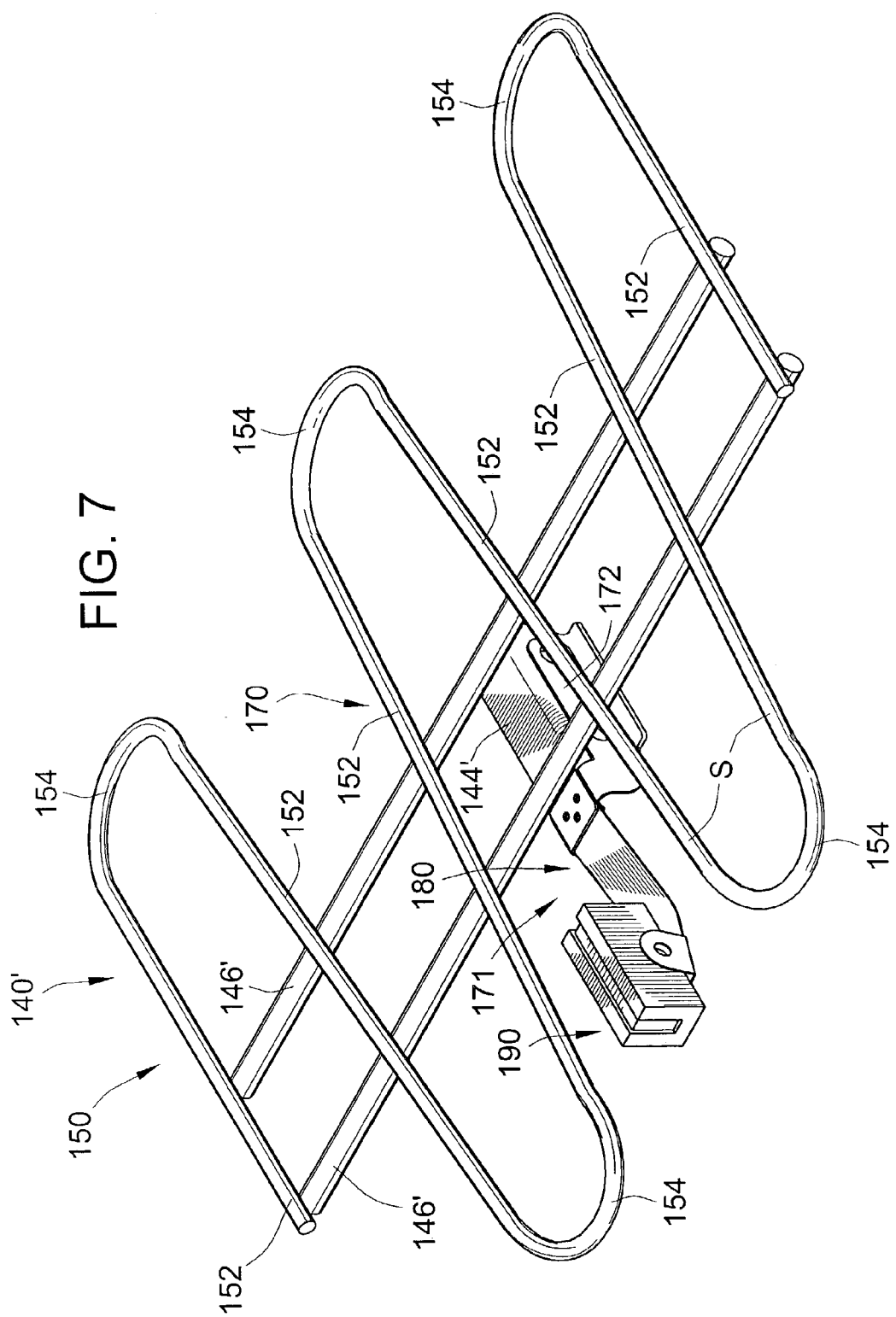

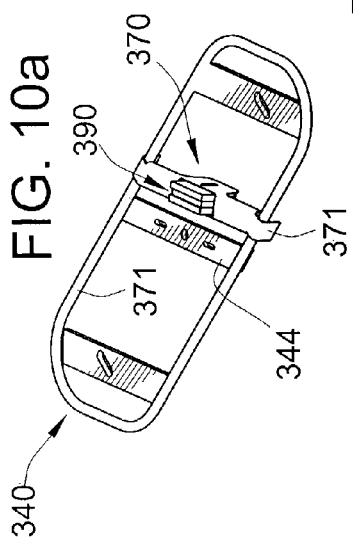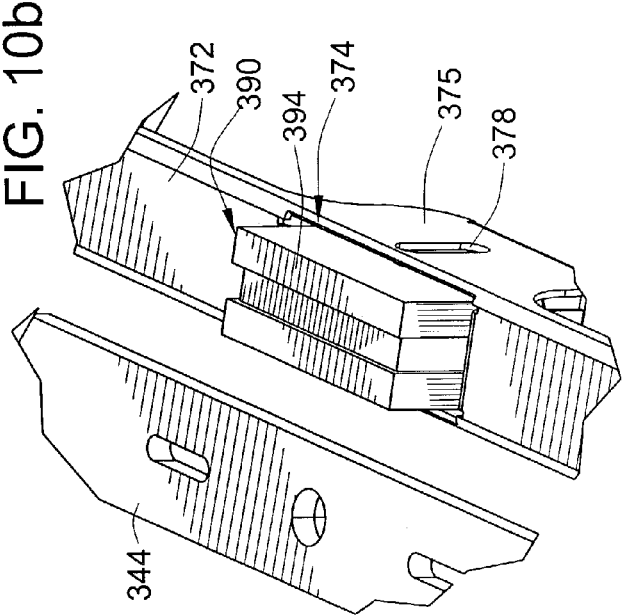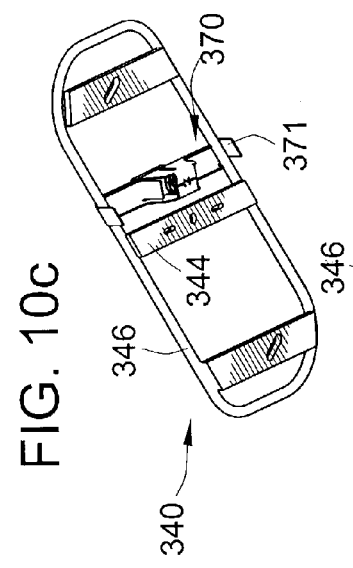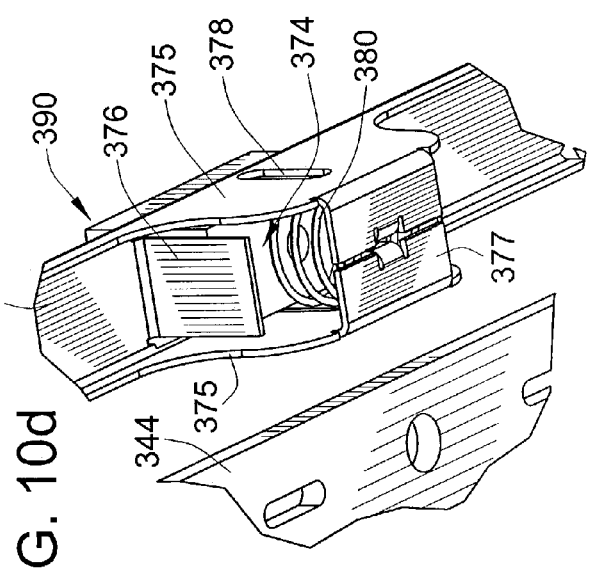

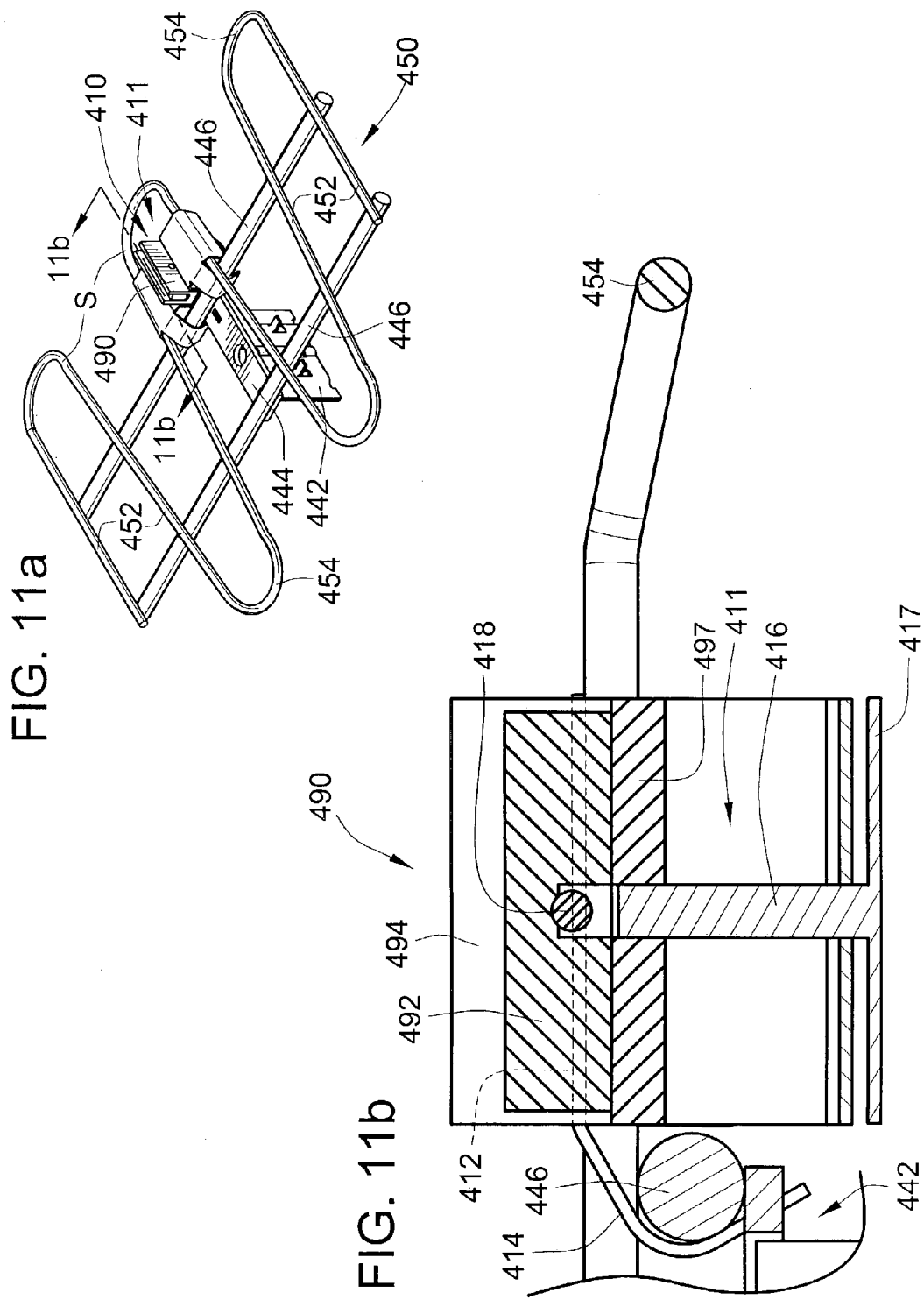

MAGNETIC CENTERGUIDE

FIELD OF THE INVENTION

The present invention relates generally to grids used to support pans on a food processing conveyor, and more particularly relates to magnetic guides for maintaining the position or orientation of pans with respect to the grids.

BACKGROUND OF THE INVENTION

In the commercial food processing industry, it is conventional to utilize conveyors having a series of grids attached to the conveyor to carry the food product over a predetermined path for processing. For example, in the baking industry, large proofers and ovens employ continuously moving conveyors to transport dough products through the baking process. The conveyors trace a multi-tier spiral or circular path through the proofers or ovens to achieve sufficient residence time to allow the dough to rise in the proofer and to bake in the oven. The dough products are placed on metal pans which can vary in size and shape depending on the product, i.e. rolls, loaves, etc. One particularly successful bakery conveyor system has been developed by APV Baker, and is generally disclosed in a number of prior patents including U.S. Pat. Nos. 4,997,365 and 5,010,808.

Generally, bakery conveyors include an elongated track supporting and guiding a conveyor chain to define a path of travel. A series of grids, attached to the chain, support a series of pans carried along the path through one or more processing operations. It is inevitable that pans will be jostled around on the track due to such things as vibration or interference with other structures or pans. Travel around curves in oval or spiral conveyors will also cause the pans to move and change position on the grid. Shifting of any significant amount is undesirable because it can cause interference between pans, and occasionally cause pans to fall off the conveyor or otherwise cause a jam, which results in downtime of the conveyor and the baking system.

Magnetic grids, usually containing 2 or more magnets per grid, have been suggested to hold the pans in place. In some designs, the magnets are fixed vertically but allow a limited amount of movement in a horizontal plane. In other designs as exemplified by Kasik U.S. Pat. No. 4,836,360, the magnets can move vertically and horizontally. Magnetic grids are generally characterized by the fact that the pans are supported on and carried by the magnets and the magnets in turn carried by the grids. In effect the magnets, not the grids, provide the support surface for the pans.

Since not all track is straight, travel of the pans around curves can create problems. Sometimes pans are placed on only a single grid, while at other times a pan will be supported on 2 or more grids. In traversing curves, relative movement between the pans and the grids is a given, and controlled magnet movement has been suggested as a mechanism for allowing this movement around curves yet keeping the pans affixed to the magnets. Pans originally misaligned will at best remain misaligned, and at worst become further misaligned, interfere with another pan, or fall off the conveyor. Due in part to the various combinations of pan size and grid geometry, problems can arise which are not all readily solved. For example, baking can be disrupted if a pan is not placed properly, or if it interferes with another pan.

Centerguides have also been used to help align pans in the first instance, and keep them tracking correctly, including tracking through curves. Centerguides are mechanical structures which project above the grid surface to engage or contact some part of the underside of a pan which is being carried on the surface of a conventional grid or on the magnets of a magnetic grid. Conventional mechanical centerguides utilize a guide member which projects above the grid and engages the underside of the pan intermediate a pair of dough-holding pockets; mechanical engagement between the guide and the pockets tends to keep the pan tracking correctly. Mechanical centerguides are sometimes preferred to magnetic grids because they function to keep the pan oriented with respect to the direction of conveyor travel. Theoretically the center of the pan, which is engaged by the centerguide, is held on the center of conveyor travel. However pans vary, for example in number of pockets, placement of pockets, location of the inter-pocket gaps, etc., presenting limits to the utility of centerguides in some circumstances. The situation can be further complicated when pans of different configuration are utilized by the baker at the same time, such that successive grids are carrying pans of different configuration.

To overcome some of these problems, a rocker type guide has been employed. The rocker guide has two physically connected but laterally spaced guides, one of which is centered on the path of travel, the other being non-centered, and only one of which is operative at any given time. The guides are mounted on opposite ends of the rocker which can pivot to dispose one of the guides below, and the other guide above the grid surface. The pan underside pushes one of the guides below the grid to raise the opposite guide hopefully between adjacent pockets of the pan. As the conveyor carries the grids around the defined track, the guide, riding in the space between the pockets, attempts to maintain the orientation of the pan on the grid. Even with rocker guides, the operative guide is held above the grid surface by a positive mechanical mechanism.

Unfortunately, the width of the rocker guides vary with different grids, dictated by the type of product being processed. In some situations, the width of the rocker guide is insufficient and both of the laterally spaced guides may lie beneath the bottoms of two pockets, rather than in between pockets. This condition would fail to laterally restrict the pans and indeed would cause instability in the pans. Further, neither of the two aforementioned guides seek to accommodate different depths of the pockets, or differently sized spaces between the pockets.

BRIEF SUMMARY OF THE INVENTION

In light of the above, it is a general aim of the present invention to provide a magnetic centerguide that is applicable to different types of pans having different numbers of pockets and different shapes of pockets, including different widths, depths and spaces between pockets. Such a centerguide can be characterized as universal, with the following proviso. Universality can be important not only to a user who processes many different types of products, but also the equipment manufacturer who might sell common equipment to many different users each with much simpler requirements.

It is an object of the invention to provide a magnetic centerguide which is attached to either the grid or the grid mounting structure, and which carries a centerguide which is magnetically attracted to the pan.

It is a feature of certain embodiments that a spring assist is provided for assisting the movement of the magnet toward the pan. In other embodiments, the magnet itself provides the motive force for raising the centerguide to contact the pan.

The invention can be characterized in a number of ways. According to the invention there is provided a magnetic centerguide for a grid which is structured for travel along a path of a conveyor. The grid defines a support surface that supports a pan. The magnetic centerguide includes a magnet having an upwardly facing portion which is magnetically attractable to the underside of the a pan when placed on the grid. A guide support carries the guide member and supports it with respect to at least two operative positions which are determined by the position of a pan on the grid. A first position is at or below the support surface, and occurs when a pan is supported on the grid with a pocket disposed over the guide member. A second position is with the guide member substantially above the support surface for contact in a trough of a pan supported on the grid. The guide support is attached to the grid in such a way that engagement of the guide member with the pan during travel of the grid along the path of the conveyor maintains the orientation of the pans supported on the grid.

More broadly, the invention contemplates a magnetic centerguide for a grid structured for travel along a path of a conveyor, the grid defining a support surface that supports a pan. The magnetic centerguide is based on a guide member which includes a magnet and has an upwardly facing portion magnetically attractable to the underside of a pan when placed on the grid. A guide support is connected to the grid and carries the guide member in such a way that the guide member can raise to a plurality of operative positions at or above the support surface to engage the underside of a pan when supported on the grid to maintain the orientation thereof.

The invention also provides a guide assembly for a grid which is structured for travel along a path of a conveyor. The grid defines a support surface that supports a pan. The guide assembly comprises a guide member mounted to the grid. The guide member includes a magnet having an operative upper surface. The guide member is mounted for movement of the magnet with respect to the support surface in a vertical direction and within a range including (a) a first position where the upper surface is above the support surface and (b) a second position where the upper surface is at or below the support surface.

Another way of characterizing the range of movement of the magnet is that the magnet includes a range of movement which is sufficient to position the upper contact area of the magnet (a) adjacent the support surface for contacting an underside of a pocket when a pocket of a pan is positioned above the magnet, and (b) above the support surface for contacting an underside of a pan at a position between pockets when the pockets are positioned to the side of the magnet.

In certain respects the invention can be characterized as a guide assembly for a grid structured for travel along the path of a conveyor. The grid defines a support surface that supports a pan. The pan has a plurality of pockets separated by inter-pocket gaps. The guide assembly comprises a magnet mounted to the grid for gripping a pan. The magnet has a width less than the width of an inter-pocket gap. The magnet is mounted to the grid at a position centered on the path of travel.

Somewhat more narrowly the invention can be characterized as a grid assembly for supporting a pan on a conveyor defining a path of travel. The grid assembly comprises a grid mounting plate structured for attachment to the conveyor. A grid structure is attached to the grid mounting plate and defines a support surface for supporting the pan. A centerguide assembly is attached to the grid mounting plate. The centerguide assembly includes a magnet mounted for vertical movement relative to the support surface for contact with the underside of a pan supported on the support surface. The magnet is mounted over the conveyor for maintaining the orientation of the pan as it travels along the path.

The invention provides a centerguide for a grid structured for travel along the path of a conveyor. The grid defines a support surface that supports different types of pans. A first pan type has a centerline aligned with a column of pockets. A second pan type has a centerline positioned between columns of pockets. The guide comprises a magnet mounted to the grid at a position centered on the path of travel. The magnet is mounted for vertical movement relative to the support surface for contact with the underside of a pan when supported on the surface. The magnet takes a first position below the support surface for the first pan type. The magnet takes a second position above the support surface for the second pan type.

In certain broad aspects the invention contemplates a guide assembly for a grid structured for travel along a path of a conveyor. The grid defines a support surface that supports different types of pans having different pan profiles. The guide comprises a magnetic guide member combined with means for attaching the magnetic guide member to the grid for movement of the guide member relative to the support surface to adapt the guide to different pan profiles.

Viewed in another way, the invention comprises a guide for a grid structured for travel along a path of a conveyor. The grid defines a support surface that supports different types of pans having different pan profiles. The guide comprises a magnetic guide member attached to the grid for vertical movement relative to the support surface. The guide member is positioned for a magnetic attraction to a pan placed on the grid. The guide member automatically adjusts its vertical position to accommodate for the profile of the pan.

The invention also comprises a guide assembly for a grid structured for travel along a path of a conveyor. The grid defines a support surface arranged and constructed to support a pan. The guide assembly comprises a magnetic guide member connected to the grid. The magnetic guide member is positioned above the support surface in a neutral position. The guide member is arranged for vertical movement above and below the neutral position.

Certain of the embodiments in the invention are characterized by a guide assembly for a grid structured for travel along a path of a conveyor. The grid defines a support surface for a pan. The guide assembly comprises a spring arm having a first end attached to the grid and a second end configured as a mounting surface. A guide member is attached to the spring arm at the mounting surface and has a neutral position above the support surface and centered on the path of travel. The guide member includes a magnet positioned to be attracted to a pan when positioned on the support surface.

The invention also contemplates a guide assembly for a grid structured for travel along a path of a conveyor. The grid defines a support surface for a pan. The grid assembly comprises a guide support attached to the grid and having a open top pocket formed therein. A guide member includes a magnet and is mounted in the pocket for vertical movement. Means are provided for causing the guide member to contact the underside of a pan when placed on the support surface.

Such means can include the magnetic attraction of the magnet either alone or combined with an auxiliary spring force.

The invention also contemplates a grid assembly for carrying a pan along a conveyor defining a path of travel. The grid assembly comprises a grid mounting plate structured for attachment to the conveyor. A first support bar is attached to the grid mounting plate as is a second support bar which extends across the first support bar to define a support surface for supporting the pan. A guide member is attached to one of the support bars and positioned above the support surface to assist in retaining a pan on the grid assembly. The guide member includes a magnet mounted for vertical travel in a range sufficient to contact and attach to the underside of pans of a plurality of configurations when placed on the support surface.

The invention also has method aspects, for example, a method for retaining different types of pans on a support surface of a grid which is structured for travel along a path of a conveyor. A first pan type has a centerline aligned with a column of pockets. A second pan type has a centerline positioned between columns of pockets. The method comprises the steps of mounting a magnet to a grid for a vertical movement relative to the support surface at a position centered on the path of travel. The method includes positioning the magnet at a first position below the grid surface for the first pan type, and positioning the magnet at a second position above the support surface for the second pan type.

These and other advantages of the invention, as well as additional inventive features, will be apparent from the description of the invention provided herein when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 1a is a perspective view of a curved conveyor section having grids employing an embodiment of the universal centerguide constructed in accordance with the teachings of the present invention;

FIGS. 1b–1e depict a grid employing an embodiment of the universal centerguide;

FIGS. 2a–2d depict the grid of FIGS. 1a–1e having different pans supported thereon;

FIGS. 4a–4e depict the grid and universal centerguide of FIGS. 1–2, the guide being in a lowered position;

FIGS. 5a–5d depict the grid and universal centerguide of FIGS. 1–2, the guide being in a raised position;

FIGS. 6a–6b depict another embodiment of the universal centerguide constructed in accordance with the teachings of the present invention;

FIG. 7 depicts the universal centerguide of FIGS. 6a–6b applied to a different grid type;

FIGS. 10a–10h depict still another embodiment of the universal centerguide constructed in accordance with the teachings of the present invention, applied to yet another grid type; and FIGS. 11a–11f show another and preferred embodiment of the universal centerguide constructed in accordance with the teachings of the invention.

Figure 1C:
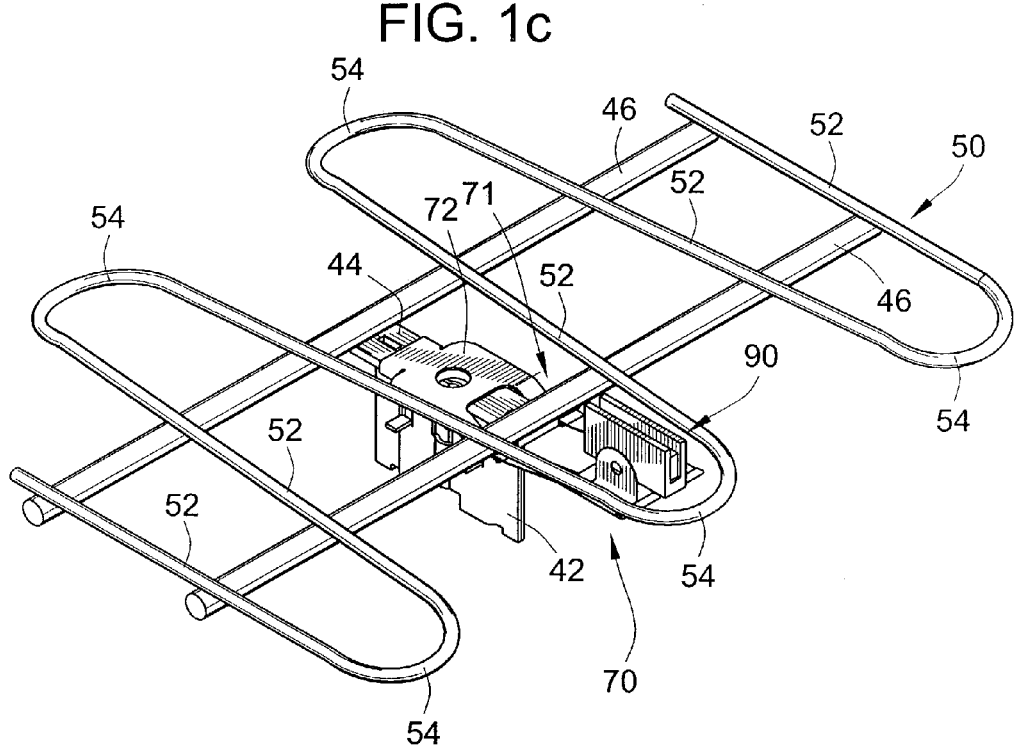

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Referring now to the drawings, FIG. 1a illustrates a curved section of a conveyor 20. The conveyor includes a track 22 which houses and guides a chain 24. The conveyor 20 has a centerline or path of travel defined by the track 22 and chain 24 within the track.

As is known in the art, the chain 24 generally includes a plurality of connected links 26, each having a plurality of rollers 28 which guide and support the chain 24 as it travels through the track 22. In the illustrated embodiment, each link 26 includes a vertical pin or bolt 30 which is used to connect the link 26 to a grid 40. It will be recognized by those skilled in the art that any type of conveyor can be used with the present invention, and many types of connecting structures can be used to attach each grid to the conveyor.

The grids 40 will now be described with reference to FIGS. 1b–1c, however it will be recognized that many different types of grids can be used with the present invention, as will be described in more detail herein, as well as in concurrently filed co/pending application Ser. No. 10/464,103 entitled Method of Retrofitting Magnetic Guide to a Grid. Each grid 40 includes structures for attaching the grid to the conveyor. In the illustrated embodiment that structure includes a grid mounting plate 44 horizontally disposed and centered on the grid. A pendant plate 42 is also utilized to attach the grid 40 to the chain 24 and vertically space the grid therefrom. The pendant plate 42 includes a vertical sleeve for receiving the bolt 30, and is sandwiched between the chain 24 and the grid mounting plate 44, all of which is fixed in place by the bolt 30 and corresponding nut (not shown). Thus the grid mounting plate 44 is horizontally mounted atop the pendant plate 42. A support bar structure is carried by the grid mounting plate and is configured to support a pan. In the illustrated embodiment, at least one, and preferably two as depicted, support bars 46 are attached to the grid mounting plate 44 and extend transversely relative to the path of travel (the path being to the upper right in FIG. 1b). End plates may connect the transverse support bars 46.

In this embodiment of the grid 40, a second support bar 50 is attached to the transverse support bars 46 and defines a grid support surface on which pans rest. The support surface lies in a generally horizontal plane. The support bar 50 is generally W-shaped, and zigzags back and forth across the support bars 46. More specifically, the support bar 50 includes several longitudinal portions 52 extending generally parallel to the path of travel, although somewhat rotated to the left or right. The longitudinal portions 52 are connected by U-shaped portions 54, which preferably are bent slightly downwardly.

Figure 1D:
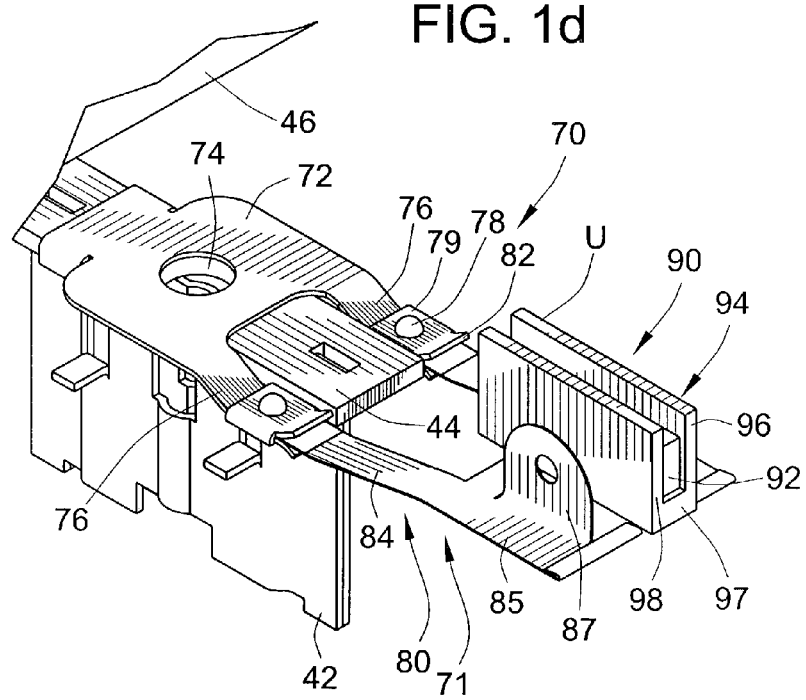
Figure 2A:
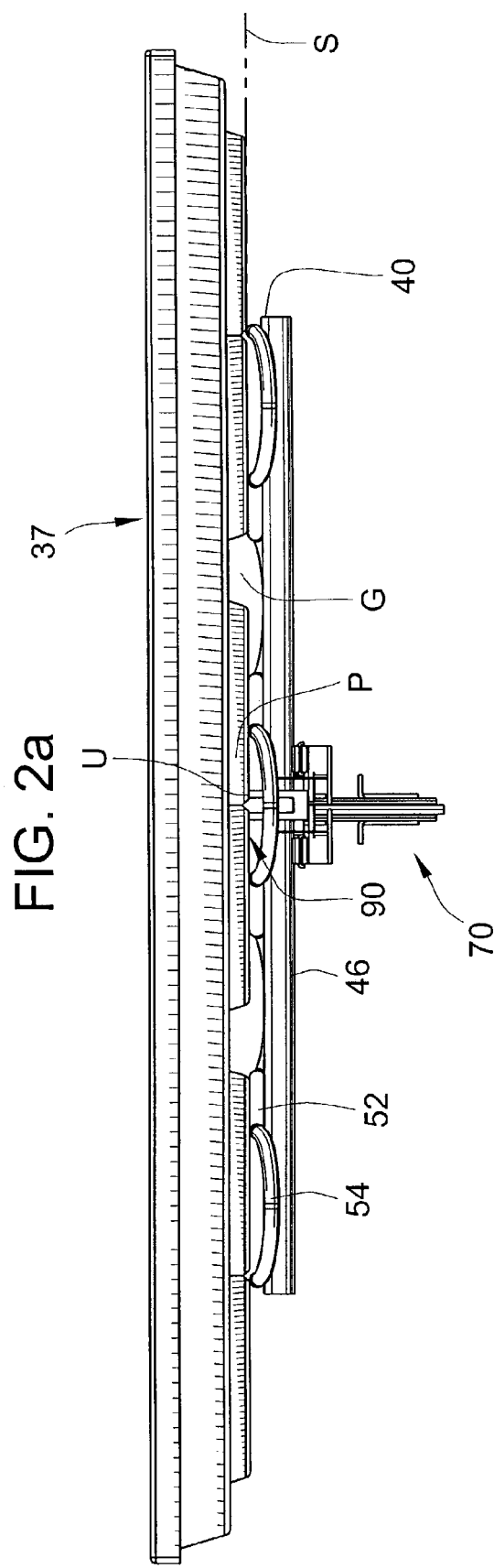
Figure 2B:
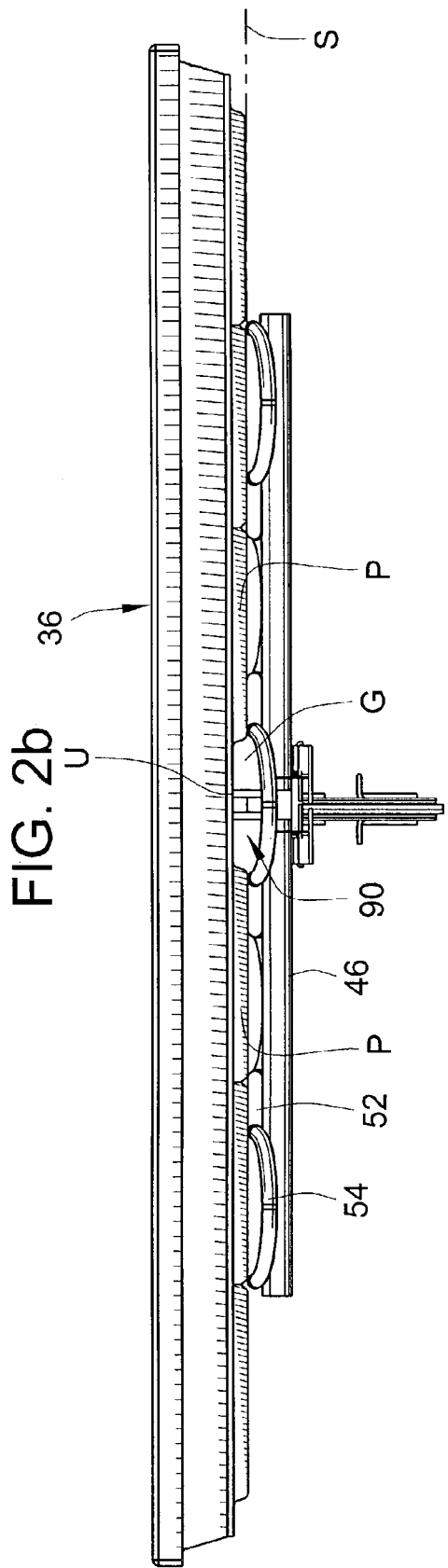
Figure 2C:
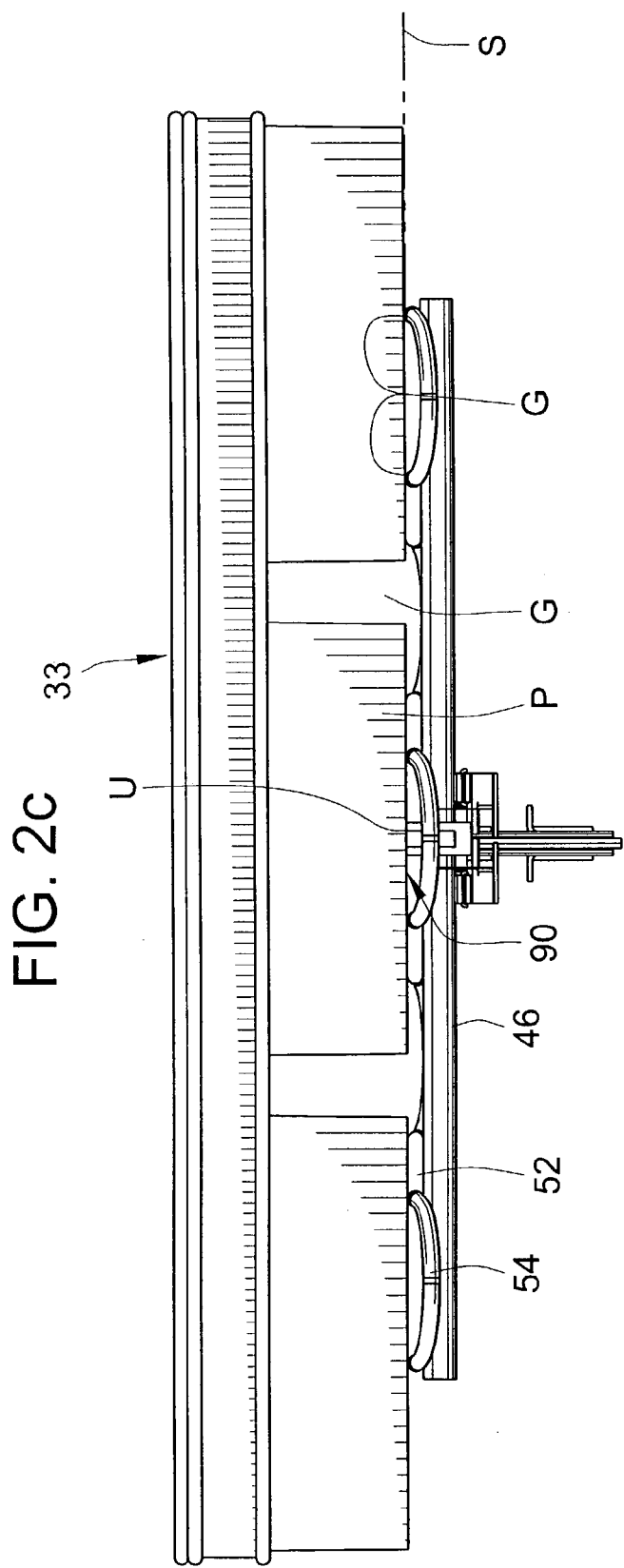

One embodiment of a magnetic centerguide assembly 70 is also shown in FIGS. 1a–1e, and most clearly seen in the enlarged, partially cut-away view of FIG. 1d. For clarity of illustration, the forward horizontal support bar 46 is not shown in FIG. 1d.

In practicing the invention the centerguide assembly 70 is connected to the grid structure by a guide support 71 which is attached to the grid, such as by attachment to the support bars or to the grid mounting structure itself. In the present example, the guide support 71 is connected by way of attachment to the grid mounting plate. The guide assembly 70 generally includes a guide mounting plate 72 structured for attachment to grid mounting plate 44. In the illustrated embodiment, the guide mounting plate 72 rests on top of grid mounting plate 44 and includes a hole 74 that matches the hole in the grid mounting plate 44 for receiving the bolt 30, which is then secured with a nut (not shown). Hence the attachment structure used to connect the grid 40 to the conveyor 20 is also used to attach the centering guide 70.

In carrying out the invention, the centerguide assembly 70 and its guide support 71 carry a guide member 90, which in turn supports magnet 92. This structure provides the magnet 92 with the capability to have its operative upper surface U depressed below the grid support surface, and also to move vertically above the grid support surface, so that it can engage the pan in the inter-pocket gaps. In some cases the guide support 71 includes spring elements to provide this vertical movement capability. In other embodiments, springs can be dispensed with and magnetic force relied upon. Both springs and magnets can provide the vertical movement capability in other embodiments. In the present embodiment, spring arms are utilized to suspend the magnet from the grid and provide the aforementioned vertical movement capability, assisted by the magnets. For convenience, in the present embodiment, the mounting arms are of two piece construction, including the previously described guide mounting plate 72 and an attached spring arm 80. The guide mounting plate 72 extends laterally beyond the grid mounting plate 44 and includes two legs 76 that extend downwardly and forwardly. The spring arm 80 is of bifurcated construction, including two legs 82, 84 which are attached to the mounting plate legs 76. Although any well known fastener can be used, this embodiment utilizes a rivet 78 struck through a protective plate 79, the spring arm 80, and the leg 76. The protective plate has downturned sides, as well as an upturned front lip, mirroring the downturned front lip of the legs 76, providing protection to the spring arm 80, and allowing smooth deflection of the spring arm 80.

The spring arm 80 in the illustrated embodiment is a mechanical spring, and more particularly a flat metal spring. Other mechanical springs can be used however, and the spring arm need only comprise a resilient material that deflects from a neutral position. As will be described in more detail herein, the spring arm 80 is utilized to provide vertical movement to a magnetic guide member 90 attached thereto, and thus may also comprise a pivotable arm that does not need to be of a resilient or deflecting material. A simple rigid arm mounted to the guide mounting plate 72 for rotation about a horizontal axis would suffice. A spring or other resilient material could then be employed to bias the rigid arm to a neutral position, although this is not essential, as vertical movement of the magnetic guide member 90 as described is the primary requirement.

Turning back to the illustrated embodiment, the left and right springs 82, 84 of the spring arm 80 extend forwardly and upwardly to generally horizontal mounting surfaces 83, 85 each having a bent over front lip and upturned mounting flanges 86, 87. The flanges 86, 87 define an internal space for mounting a magnetic guide member 90 to the spring arm 80.

Figure 4C:
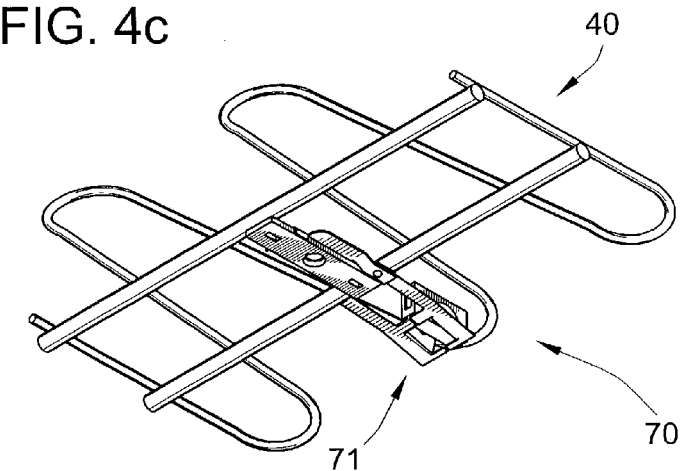
Figure 4D:
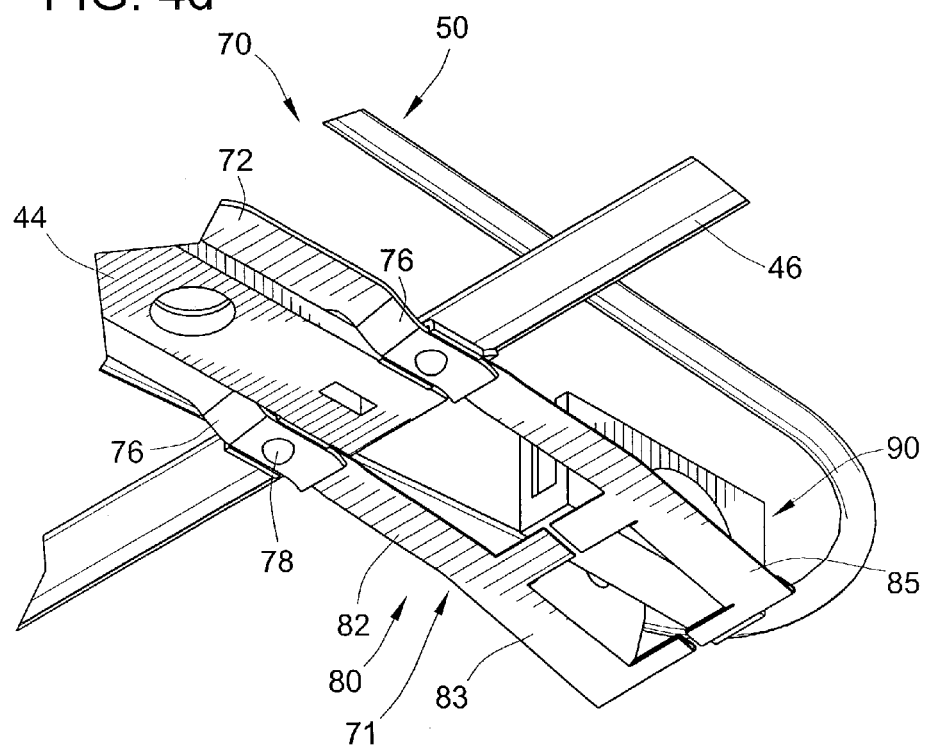
Figure 4E:
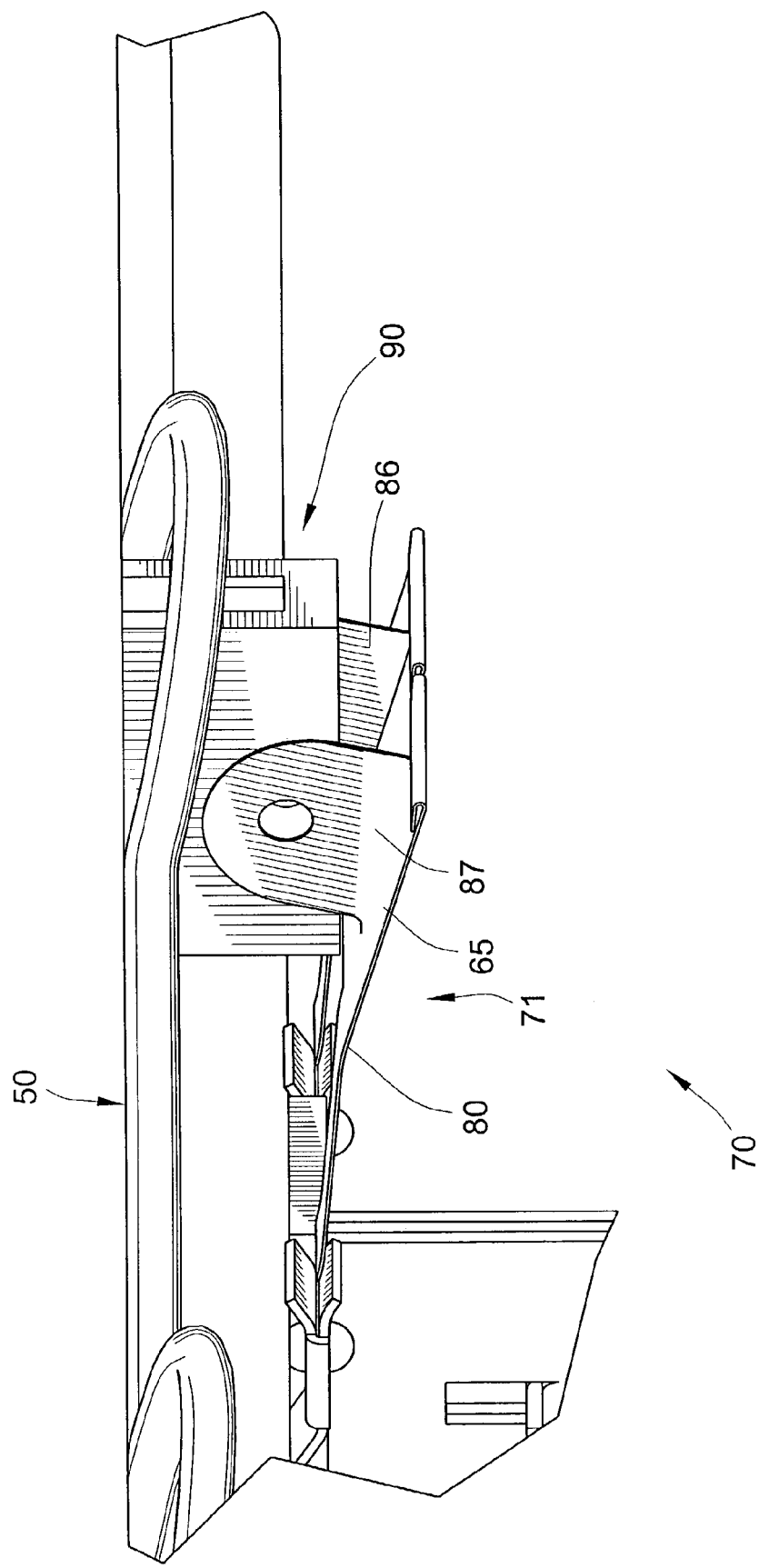
Figure 5C:
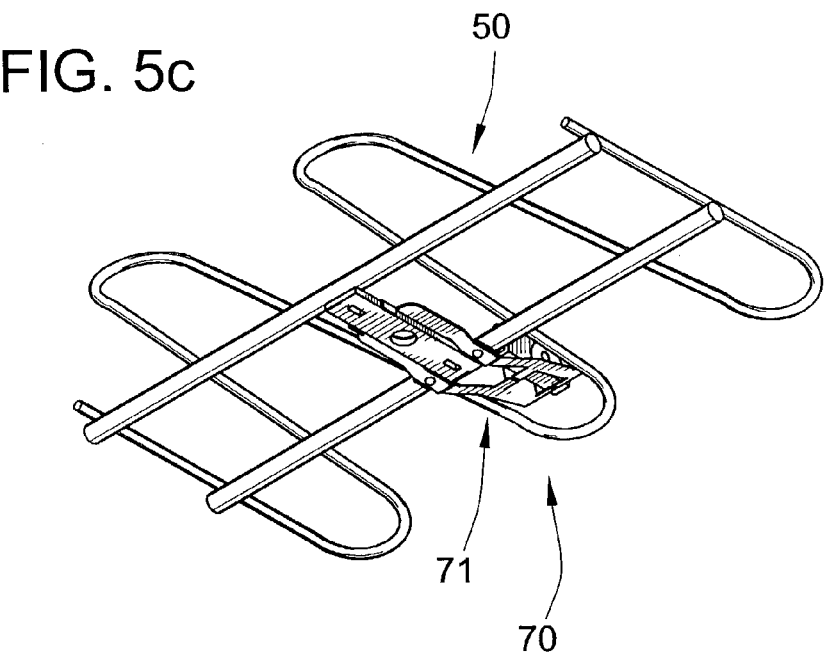
Figure 5D:
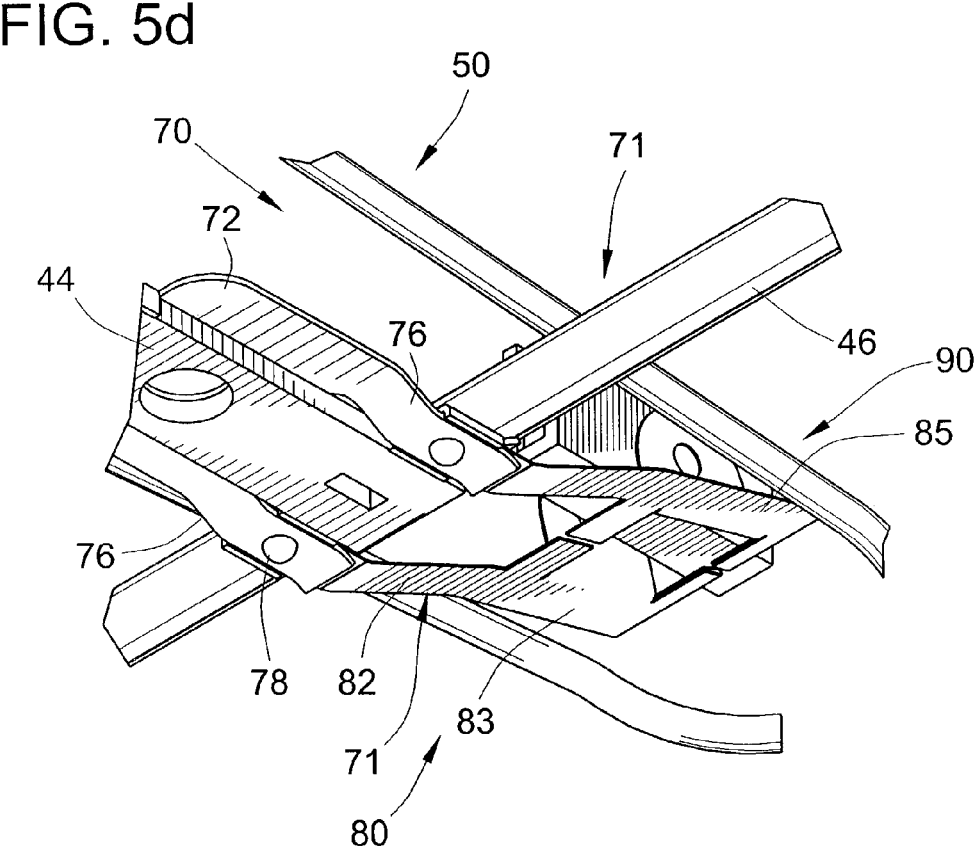

It will be recognized that the guide assembly 70 may be mounted to the grid 40 after the grid has been fully assembled. That is, the left and right springs 82, 84 may be spread apart at their free ends (i.e., the ends which are to be attached to the magnet) (see for example FIG. 4*d*). While being held in the spread configuration the spring arm 80 is passed over the grid mounting plate 44 and under the support bar 46 so that guide mounting plate 72 may be mated with grid mounting plate 44 and bolt 30. The plate 72 may then be attached to the grid 40 and the magnetic guide member 90 attached to the spring arm 80.

The magnetic guide member 90 in the illustrated embodiment includes a magnet 92 contained in a housing or yoke 94. In some cases the guide member 90 will include only the magnet and other structure can be dispensed with. The magnet 92 and housing 94 have been illustrated as rectangular, although they may be of various shapes, sizes and orientations depending on the particular application. Suffice it to say that the guide member 90 is sized so that at least a portion of the guide member 90 fits between a column of pockets or indentations on the underside of a pan. Preferably, the guide member 90 is centered on the path of travel, although this location is not essential in the broadest practice of the invention. In the illustrated embodiment, the housing 94 is generally U-shaped defined by left and right members 96, 98 connected by a link 97. Preferably the left and right members 96, 98 are of magnetically permeable material to concentrate lines of flux between the magnet and the pan which comes into contact with the members 96, 98. When so configured, the upper surface of the members 96, 98 can be considered the operative upper surface U of the magnet. The link 97 is of non-magnetically permeable material, so as not to introduce a magnetic shunt at that location, which concentrates the lines of flux in the pan. Preferably, the magnet 92 is glued inside the housing 94, and a cover (not shown) is fit over the area of the magnet shown exposed in the figures, to be held in place by the same glue or adhesive.

The left and right members 96, 98 of the housing 94 include two opposing apertures that match apertures in each of the flanges 86, 87 for attaching the guide 90, typically by way of a threaded fastener or pin. The guide 90 is preferably spaced above the mounting surfaces 83, 85, and is pivotally attached to the flanges 86, 87 for rotation about a horizontal axis. It will be readily recognized by those skilled in the art that numerous other well-known attachment structures can be used to mount the guide 90 to the spring arm 80. For example, the outer surface of the housing 94 could include tabs that correspond to the apertures in the mounting flanges 86, 87, which in turn are of resilient material to deflect and permit entry of the tabs. Further, a hole could be placed through the entire guide 90 so that a single fastener could be used. Still further, a latch mechanism, such as one using male and female members, could be employed.

The magnetic centerguide of this embodiment, being attached to the grid mounting plate which itself is connected to the conveyor chain, is readily mounted on the conveyor centerline, which is the preferred position. There may be instances, however, as will be illustrated in connection with subsequent embodiments, where mounting of the centerguide at a location other than the conveyor centerline is desirable. An alternate position might be desirable for a number of reasons which could include the form of the pans which are intended to ride on the grid, the fact that large pans are used covering multiple grids, or other matters of convenience, such as accommodating size constraints. Unless the context indicates otherwise, the use of the term centerguide herein is intended to encompass all such variations.

Figure 3G:
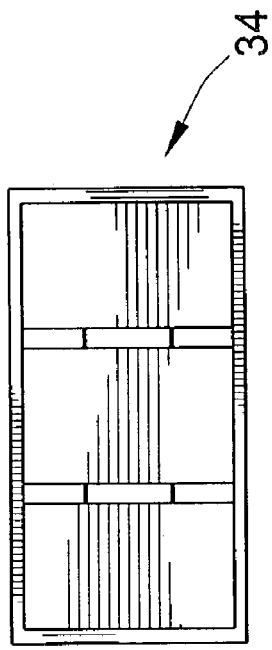
FIGS. 3a–3r depict a selection of pans used with the present invention.
Figure 3I:
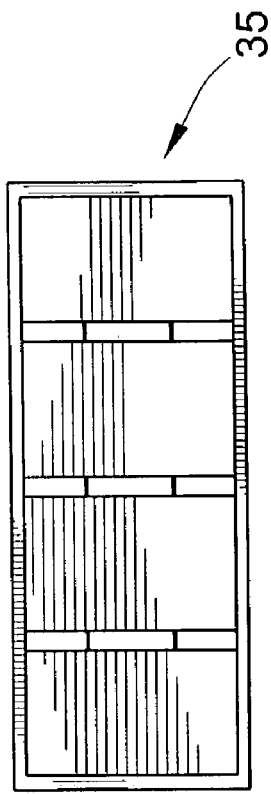
Figure 3H:
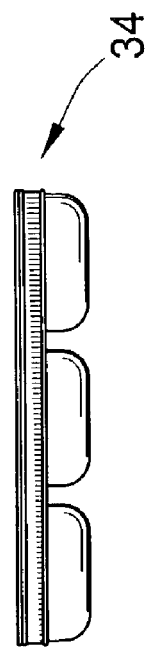
Figure 3J:
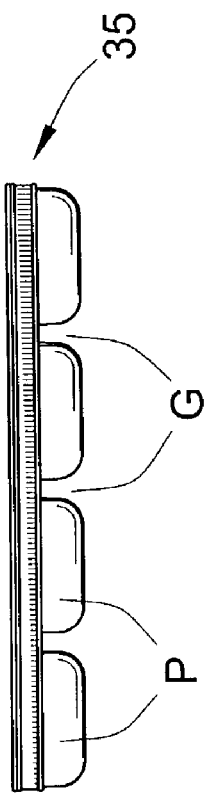

As noted in the background section above, pans in food processing operations, and particularly baking operations, come in all shapes and sizes depending on the product being processed. Some standard baking pans 31, 32, 33, 34, 35, 36, 37, 38, 39 have been depicted in FIGS. 3a–r. It can been seen that the pans generally include columns (extending up and down on the figures) and rows (extending side to side on the figures) of indentations or pockets P for receiving dough to be formed into bread loaves, rolls, buns, etc. The reference G denotes exemplary inter-pocket gaps. FIGS. 3a–3b depict a 4-pocket bread pan having four columns and one row. FIGS. 3c–3d depict a 4-pocket bread pan having four columns and one row, the pockets being slightly tapered. FIGS. 3e–3f depict a 3-pocket bread pan having three columns and one row. FIGS. 3g–3h depict a 3-pocket pan bread pan having three columns and one row, the pockets having radiused edges. FIGS. 3i–3j depict a 4-pocket bread pan having four columns and one row, the pockets having radiused edges. FIGS. 3k–3l depict a 4-pocket bun pan having two columns and two rows, each pocket holding six buns. FIGS. 3m–3n depict a 6-pocket bun pan having three columns and two rows, each pocket holding four buns. FIGS. 3o–3p depicts a flat pan having no pockets. FIGS. 3q–3r depict a 3-pocket bun pan having nine columns and four rows.

Typically, a pan having an odd number of columns will have its centerline passing through a column of pockets. Typically, a pan having an even number of columns will have its centerline passing between a column of pockets. It will also be seen that the depth of the pockets differs, typically in the range of 1" to 6". The pockets of bun pans are typically in the range of 1" to 2" deep, while the pockets of bread pans are typically in the range of 3½" to 4½" deep.

Accordingly, it will be recognized that the universal guide 70 adapts to maintain the orientation of all of the above-described pans, and virtually any baking pan. The magnetic guide member 90 is adapted for vertical movement, preferably in a range including at or below the support surface, to above the support surface. In the embodiment shown in FIGS. 1b–1c, the guide member 90 is preferably biased to a neutral position above the support surface, generally in the range of ½" to 1½" above the support surface, and preferably about ¾" above the surface, measured from a top surface of the guide member 90. There are other embodiments which do not require this bias. In the FIG. 1b embodiment, when the swing arm 80 is spring biased, the spring is set to a biasing force less than the weight of a pan, which typically weigh around 10–20 lbs. Setting a lower biasing force is for the purpose of permitting the guide member 90 to move to a position at or below the support surface when a pocket is rested directly thereon. Thus the pans are always supported by the support surface of the grid. FIGS. 4a–4e show the magnetic guide member 90 in a lowered position about level with the support surface. FIGS. 5a–5d show the magnetic guide member 90 in a raised position well above the support surface and above the neutral position. This raised position is also the position taken by the guide 70 when a pan is removed from the grid by lifting the pan.

It can be seen in FIGS. 4a–4e and 5a–5d that the forward and rear edges of the mounting surfaces 83, 85 restrict the pivoting range of the guide member 90 relative to the mounting surfaces 83, 85 and the spring arm 80. That range is defined primarily by the distance the magnetic guide 90 is positioned above the surfaces 83, 85, which is preferably correlated with the vertical range of motion defined by the spring arm 80. Thus, the upper surface of the magnetic guide member 90 can stay in full contact with a surface of the pan throughout a full range of vertical motion as shown in the figures.

Attention is now directed to FIGS. 2a–2d. It will be seen that when a pan is located on the grid 40 with a pocket P directly above the guide member 90, the range of motion permits the magnetic guide member 90 to move or adjust downwardly to a position where its operative upper surface U is about level with the support surface S (See FIGS. 2a and 2c). More particularly, the guide member 90 has an upper surface U that moves to a position aligned with the support surface S, so that the upper surface of the magnetic guide 90 contacts the underside of the pocket P, which is generally horizontal, to retain the pan to the grid. The pivoting of the magnetic guide member 90 allows full contact with the pan.

It will also be seen that when a pan is located on the grid with two pocket columns P straddling the centerguide 70, the range of motion permits the magnetic guide member 90 to move or adjust upwardly into the inter-pocket gap G to also contact the underside of the pan (See FIGS. 2b and 2d), which includes both the spaces between the columns and rows of pockets, as well as the non-horizontal side surfaces of the pockets. For deep pockets such as those used in bread pans, the range of vertical motion of the magnetic guide member 90 may be limited so that it cannot extend upwardly far enough to contact the horizontal underside of the pan between pockets. In this case the pan will shift laterally a small degree and the magnetic guide member 90 will contact the underside of the pan at a side surface of the pocket, as shown in FIG. 2d. In fact, depending on the size of the guide member 90, the guide could contact both a side of a pocket and the horizontal underside of the pan between pockets, or even two opposing sides of opposing pockets. Most preferably, however, the magnet assembly 90 has a width which fits easily between in gaps G between pockets P such that the magnetic attraction of the guide to the pan is supplemented by mechanical interference between the guide and the trough in maintaining the orientation of the pan on the grid.

The magnetic centerguide assembly 70 of the present invention also permits secure handling of large pans, i.e. pans which span more than one grid. It is common for pans to be large enough to span two or more grids, and thus a single pan is associated with two centering guides 70 of adjacent grids 40. This requires very little adaptation by the centering guide 70, because they are centered on the conveyor chain and hence the path of travel. More specifically, when two grids carrying a single pan enter a turn, the inside edges of the grids 40 move closer together, while the outside edges of the grids 40 move farther apart. However, by way of the present invention, the centering guides 70 move only very slightly relative to each other by virtue of being centered on the path of travel. To the extent that any change in distance needs to be accounted for, the spring arm 80 can deflect to take up that play. Typically, the spring arm 80 may move slightly upwardly and/or torsionally deflect, but only to a very small degree. It can thus be seen that the centering guide 70 of the present invention provides a universal guide that adapts to virtually all different types of pans and operating conditions.

The magnet 92 of the illustrated embodiment includes north and south poles defining a magnet axis transverse to the path of travel. However, the magnet axis can be oriented in any direction, such as parallel to the path of travel. With the magnet axis transverse to the path of travel, as in the illustrated embodiment, the magnet housing 94 can comprise pole pieces of a magnetically permeable material that act as a flux guide to focus and increase the effective strength of the magnet, such as magnetic stainless steel. In the illustrated embodiment, the left and right members 96, 98 of the housing are pole pieces. The link 97 should not be of pole material so as not to short out the magnet 92, preferably non-magnetic sheet steel. At the same time, it may be desirable to place the magnet axis parallel to the path of travel, so that the magnetic guide member 90 has a two-pole contact with the pan no matter whether it is connected to the underside of a pocket, the horizontal portion of the underside of the pan or the side surface of a pocket. Thus the orientation of the magnet may be selected depending on the particular application.

The size and shape of the magnet can also be particularly configured for specific applications. For example, when a particular installation runs only a particular type of product, such as bread pans having approximately a four inch depth, it may be useful to employ a slightly modified magnetic guide in which the upper surface of the guide member may rest at about two inches or more above the support surface in the neutral position. This larger guide member 90 would also be tall enough to contact the underside of the pans between columns of pockets, rather than contacting the side surface of a pocket. Of course, the spring arm 80 would provide the requisite vertical movement to the guide member to give a range of movement that includes at or below the grid surface to several inches above that surface.

Figure 9A:
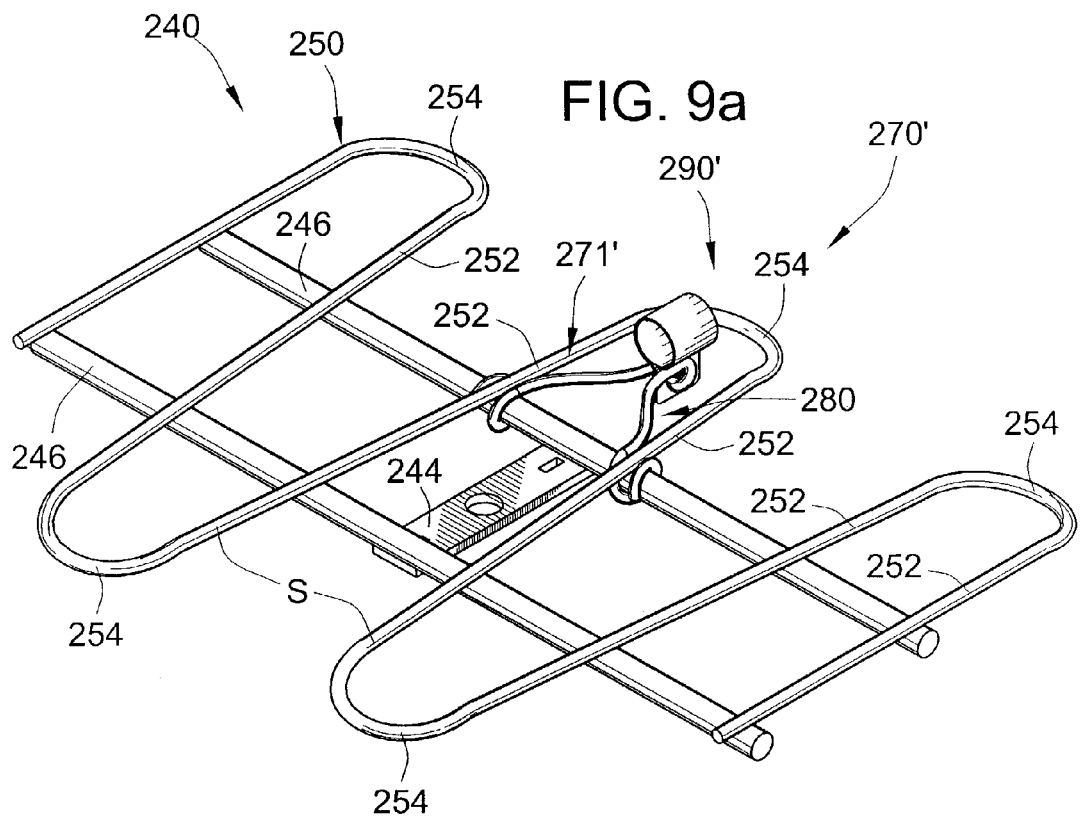
FIGS. 9a–9b depict another version of the embodiment of the universal centerguide shown in FIGS. 8a–8b.
Figure 9B:
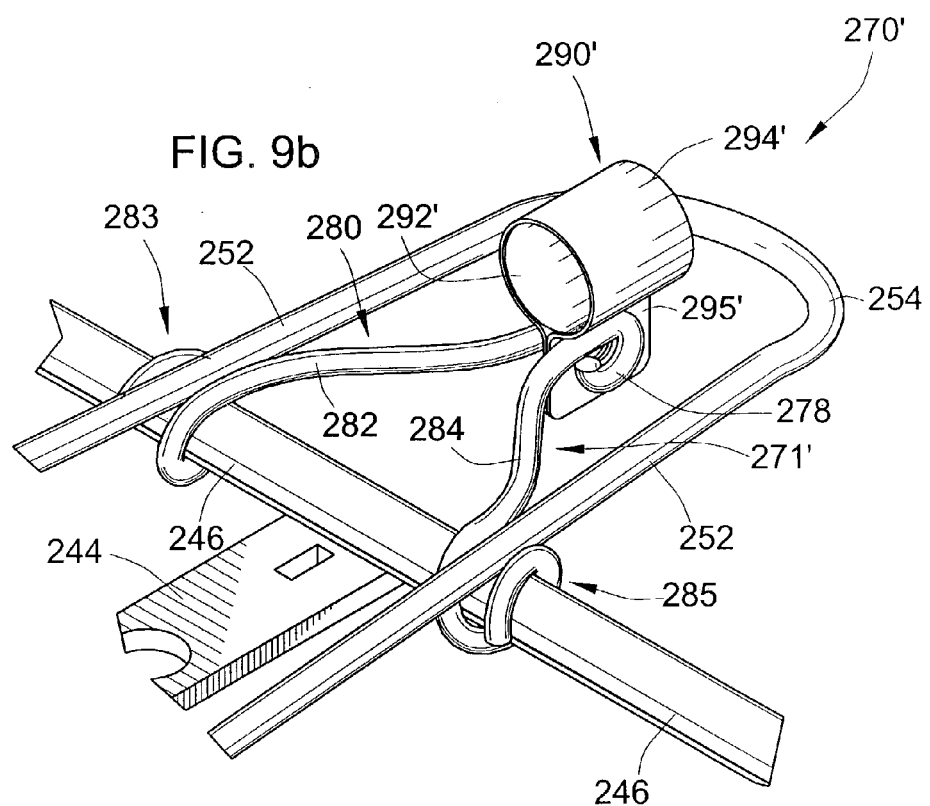
Figure 10E:
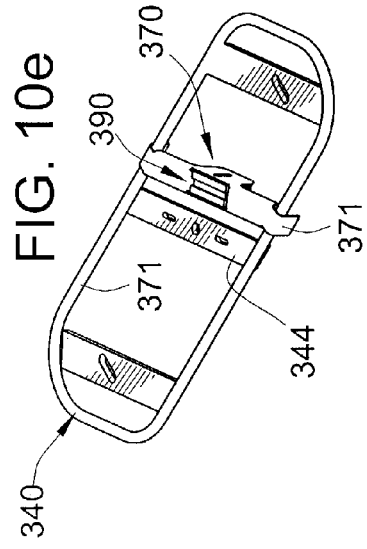
Figure 10F:
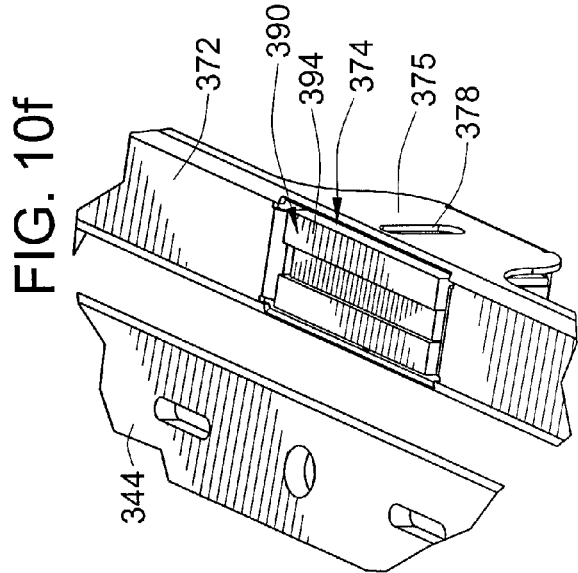
Figure 10G:
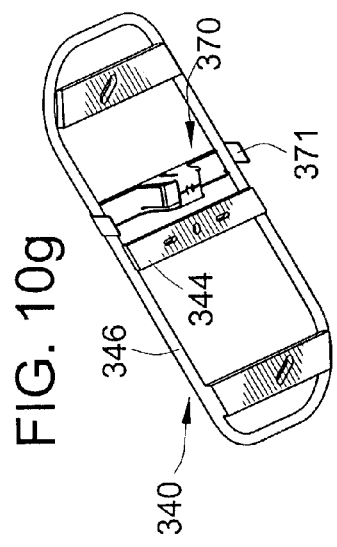
Figure 10H:
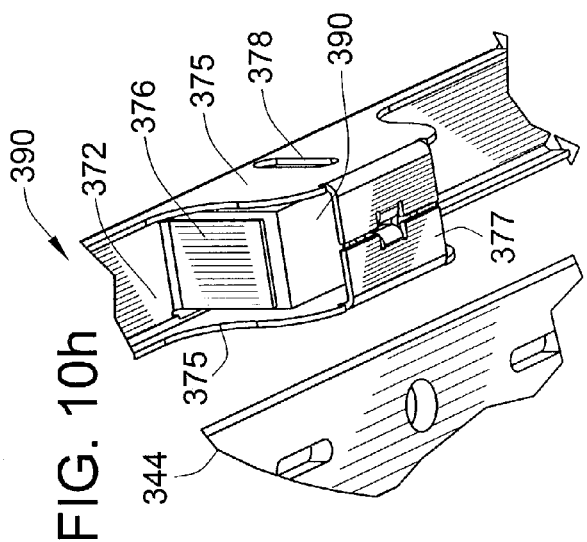

Differently shaped guide members 90 are also encompassed within the present invention. For example, the embodiment of the invention depicted in FIGS. 9a–9b illustrates a generally cylindrical magnetic guide 290'. Guides according to the invention may have virtually any cross-sectional shape. A sloped upper surface of the guide increases the possibility that at least a portion of the guide member 90 will fit between a column of pockets or indentations on the underside of a pan. A guide specifically designed for use with a particular pan type or sets of pan types can readily be employed, and could encompass a wide variety of cross-sectional shapes that are too numerous to list here, but can now be readily ascertainable by those skilled in this art. Likewise, many different shapes or structures (i.e., sloped or curved) may also be formed on the upper contact surface U of the guide member.

Turning now to FIGS. 6a and 6b, another embodiment of a guide assembly 170 constructed in accordance with the teachings of the present invention is depicted, along with a different grid 140. The grid 140 is similar to the previous grid 40, in that the grid 140 includes a grid mounting plate 144 and two support bars 146 attached to the plate. In this embodiment, the grid mounting plate 144 has a U-shaped cross-section and is structured for attachment to a conveyor by way of two spaced holes on each generally vertical leg of the U-shaped member. The support bars 146 are horizontally spaced and extend transversely relative to the path of travel (the path being to the upper right in FIG. 6a). Feet 147 are attached to the underside of the support bars 146 at opposing ends thereof. It will be recognized that the upper surface of the support bars 146 thus define the support surface S upon which the pans rest.

A guide support 171 provides means for attachment to the grid. In the illustrated embodiment the guide support includes a guide mounting plate 172 structured for attachment to grid mounting plate 144. As illustrated, the guide mounting plate 172 includes two opposing arms 173 which are generally vertically oriented to correspond with the vertical legs of the U-shaped grid mounting plate 144. Each of the arms 173 includes two holes 174 corresponding to the holes in the two legs. As such, the attachment structure used to connect the grid 140 to the conveyor is also used to attach the centering guide 170. The two arms 173 of the guide mounting plate 172 are linked by a connector 175 that is generally horizontally disposed and structured to lie on the top surface of the grid mounting plate 144.

The guide support 171 also includes a spring arm 180 which is attached to the guide mounting plate 172 at the connector 175. Again, the spring arm 180 is a mechanical spring of flat sheet metal, although other types of spring arms may be employed as described above. A top plate 179 is used in conjunction with rivets 178 to attach the spring arm 180 similar to the previous embodiment. The spring arm 180 extends forwardly and includes two opposing and upstanding mounting flanges 187 which are preferably integrally formed with the spring arm 180. The magnetic guide member 190 is the same as described in the prior embodiment, and is similarly attached to the spring arm 180, although a washer 189 (FIG. 6b) has been depicted for taking up the gaps between the guide member 190 and the flanges 187. It will be recognized that the washer 189 or several washers can generally can be used anytime based on the size and shape of the guide member 190.

As in the earlier embodiment depicted in FIGS. 1–5, the spring arm 180 allows the guide member 190 to move vertically to contact, adhere to and thereby guide pans placed on the grid. The guide member 190 is centered on the path of travel and is preferably biased to a neutral position above the support surface, generally in the range of ½" to 1½" above the support surface, and preferably about ¾" above the surface, measured from a top surface of the guide member 190. As the arm 180 is spring biased, the spring is set to a biasing force less than the weight of a pan, generally less than 10 lbs.

A related embodiment is shown in FIG. 7, the difference from FIG. 6a being that a different grid 140' is depicted. A grid mounting plate 144' similar to mounting plate 144 of FIG. 61, carries the grid structure 146, 147. The centering guide 170 is the same as shown in FIGS. 6a–6b, and is affixed to the grid mounting plate 144' by a guide mounting plate 172' as described in connection with FIGS. 6a–6b. This grid 140' includes a second support bar 150 which is attached on top of the transverse support bars 146', the second support bar 150 defining the support surface S on which the pans rest. As in the first embodiment, the support bar 150 is generally W-shaped, and zigzags back and forth across the support bars 146'. More specifically, the support bar 150 includes several longitudinal portions 152 extending generally parallel to the path of travel, although somewhat rotated to the left or right. The longitudinal portions 152 are connected by U-shaped portions 154, which preferably are bent slightly downwardly. As in all prior embodiments, the spring arm 180 allows the guide member 190 to move vertically as needed in any particular application, i.e. for any type of baking pan.

Figure 8A:
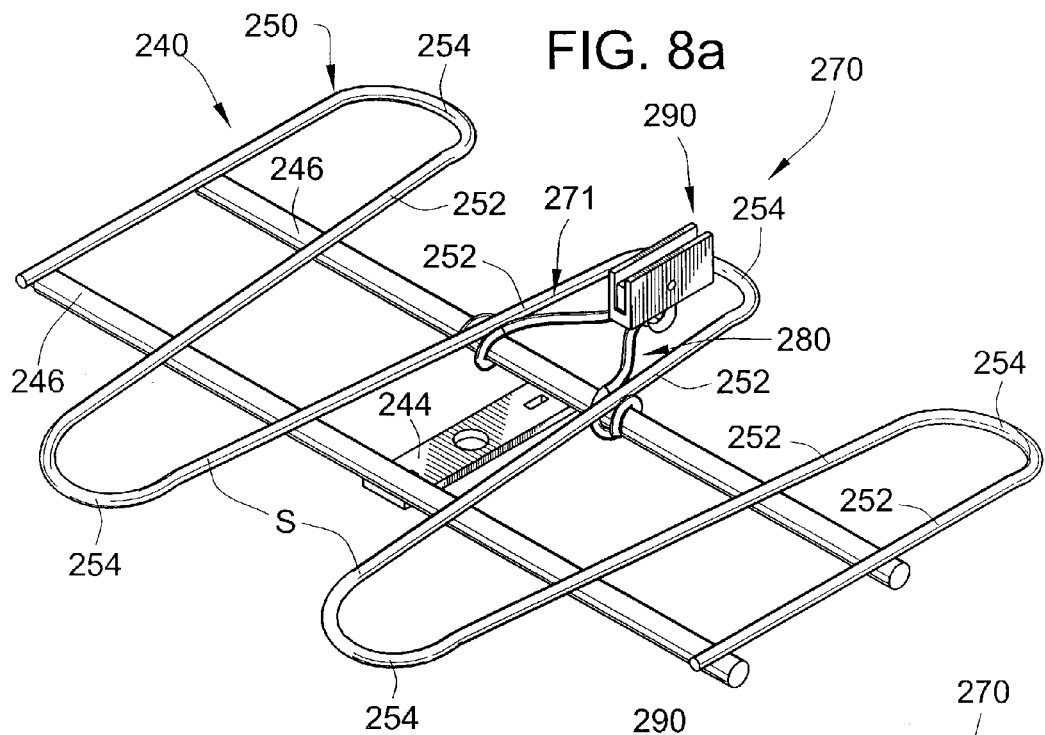
FIGS. 8a–8b depict yet another embodiment of the universal centerguide constructed in accordance with the teachings of the present invention.
Figure 8B:
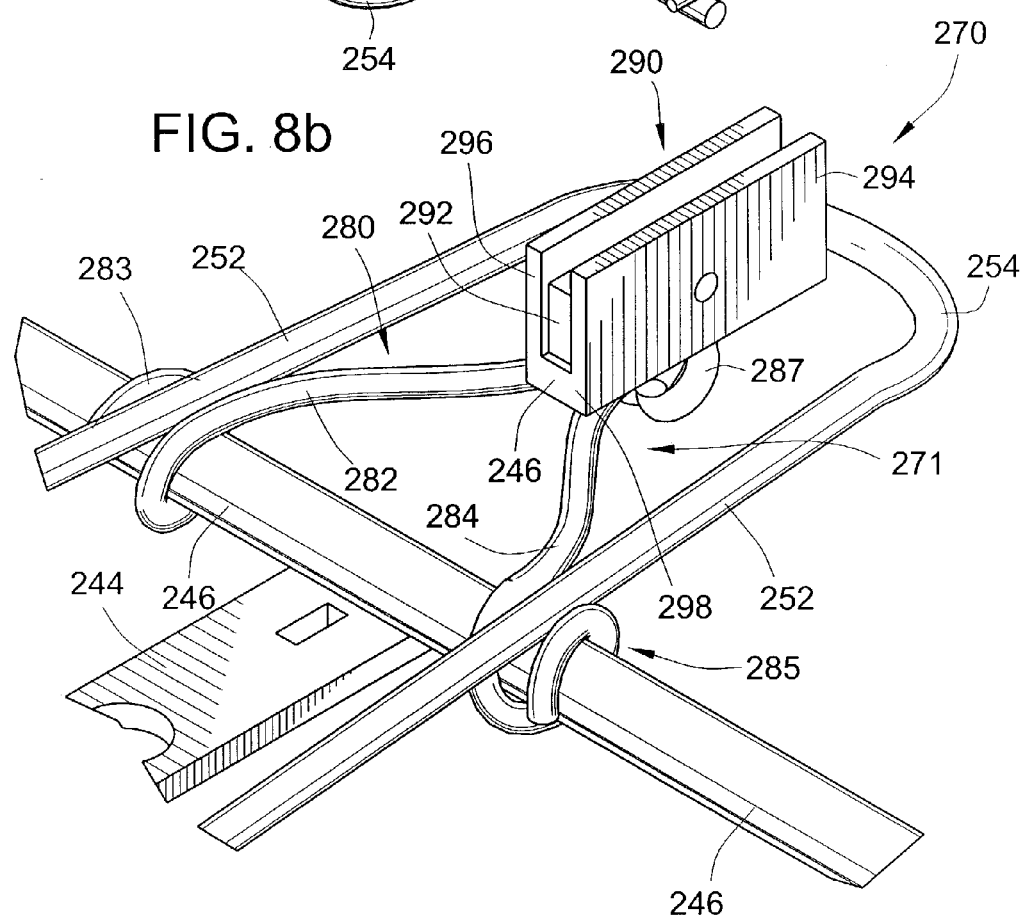

Other embodiments of the invention are depicted in FIGS. 8a–8b and 9a–9b. Referring now to FIGS. 8a–8b, the grid 240 is similar to prior embodiments, and includes a pendant plate (not shown) supporting a grid mounting plate 244. Support bars 246 are attached to the grid mounting plate 244. The second support bar 250 is attached to the transverse support bars 246 and defines a grid support surface S on which the pans rest. The second support bar 250 is generally W-shaped, and zigzags back and forth across the support bars 246, defined by straight portions 252 and U-shaped portions 254.

The universal centering guide 270 is attached to the grid structure. Whereas the prior embodiments employed attachment to the grid mounting plate, the present embodiment shows the use of one of the actual grid bars, in this case transverse support bar 246, for attachment of the magnetic guide 270. The spring arm 280 in the present embodiment is constructed of a resilient rod or wire rather than a flat metal spring. As shown, the spring arm 280 includes a left spring 282 and a right spring 284, although it will be recognized that a single spring would be effective. First ends of the springs 282, 284 are formed into coils 283, 285 which receive the transverse support bar 246. Opposing second ends of the springs 282, 284 are formed into loops used as mounting features 287. The springs 282, 284 extend forwardly and inwardly to dispose the mounting features 287 proximate one another, the holes formed by the loops 287 being aligned to mount the guide 290. The guide 290 is identical in most respects to the magnetic guide 90 described above, except that the housing 294 for the magnet 292 includes a flange extending downwardly for connection to the loops 287, typically by way of a bolt (not shown) or the like, and providing for pivotal movement of the guide 290 relative to the spring arm 280, as previously described.

The centering guide 270 can be fit to an existing grid 240 by first attaching the individual spring arms 280. More particularly, each of the left and right springs 282, 284 are attached to the grid by spreading the coil 283, 285 to form a gap in the rings of the coil. The coil 283, 285 is turned such that the axis of the coil is normal to the support bar 246, so that the gap can receive the support bar 246. The spring arm is then raised so that the coil slides over the support bar 246, then rotated to realign the axis of the bar with the axis of the coil, with the coil over the bar. Further, the gap is maintained so that the second support bar 250, in this instance one of the straight sections 252, can be received within the gap, as shown in FIGS. 8a–8b. In order to position the gap on either side of the support bar 250, it may be necessary to rotate the free end of the spring arm downwardly until the end of the coil loop clears the support bar, following which the loop can be moved along the bar 246 until it is in the proper position, then rotated back to raise the flange to the magnet mounting position. In this manner, the coils 283, 285 grip the support bar 250 between its rings, and the springs 282, 284 are prevented from rotating about the support bar 246. Rather, the springs 282, 284 are of a resilient material such as metal wire, allowing the springs to deflect while spring biasing the guide 290 to a neutral position as shown. Each of the springs 282, 284 are attached in turn, and the magnetic guide 290 is attached to the loops or flanges 287 in any conventional manner such as by way of aligned holes in mounting flanges and a threaded fastener.

As with the prior embodiments, the spring arm 280 provides the guide member 290 with vertical movement, preferably in a range including at or below the support surface to above the support surface. As shown in FIGS. 8a–8b, the guide member 290 is biased to a neutral position above the support surface, preferably about ¾ inches above the surface, measured from a top surface of the guide member 290. Accordingly, no matter which portion of a pan rests on top of the centering guide 290, the guide will attach to the pan and maintain its orientation.

The embodiment of the invention shown in FIGS. 9a–9b, is closely related to the embodiment depicted in FIGS. 8a–8b. In fact, the grid 240 is identical, as is the spring arm 280 used to attach the centering guide to the grid 240. However, in this embodiment the magnetic guide member 290' replaces the rectangular magnetic guide member 290 of the prior embodiment. The new guide member 290' is generally cylindrical in shape, defined by a cylindrical magnet 292'. The magnet 292' has its north and south poles aligned with the path of travel, i.e. the magnetic axis is generally parallel with the path of travel (the path being to the upper right in FIGS. 9a–9b). The outer annular surface of the magnet 292' is enclosed by a cover 294', the upper portion of which serves as the operative upper surface U. The cover 294' wraps around the magnet 292' and forms a flange 295' having a hole for attaching the guide member 290' to the loops 278 of the swing arm 280. It will thus be seen that the guide member 290' is adapted for vertical movement relative to the grid surface, and the guide member 290' is pivotally attached to the swing arm 280 to maintain a generally horizontal position throughout its range of motion.

A further embodiment of the invention is depicted in FIGS. 10a–10h which illustrate a magnetic centerguide which is mounted slightly off the conveyor centerline. The grid 340 is different than in prior embodiments in that it includes a continuous support bar 346 that is formed in an oblong shape to define the support surface S. The support bar 346 is connected to a grid mounting plate 344 similar to the grid mounting plates of the prior embodiments. Additional stabilizing support plates 347 also bridge the main support bar 346 near the grid edges. The centerguide 370 of this embodiment generally includes a mounting arm 372 spanning the length of the grid and attached to opposing portions of the support bar 346 by way of tabs 371, which are crimped to the bar (shown un-crimped in the figures). The arm 372 defines a pocket 374 for receiving the magnetic guide member 390, which has been depicted as the same rectangular magnetic guide shown and described in prior embodiments, although other guide members can be used.

It will be noted that the centering guide 370 of this embodiment is laterally spaced from the grid mounting plate 344 and hence the path of travel. In practice, the guide 370 will be positioned on the support bars 346 and crimped thereto a distance from the path of travel that can vary depending on the average profile of the pockets in the pans that will ride on the grid. However, it will also be recognized that this guide 370 can be applied to center the magnet on the path of travel by selecting a magnet of less height, or replacing or altering the grid mounting plate 344 to accommodate the vertical range of motion of the guide member 390. It will also be seen that the guide 370 can be applied to the grid 40 shown in FIG. 2a, by attaching the arm 372 to either the first support bars 46 or to the second support bar 50. Similarly, the grid 140 shown FIG. 6a can be utilized, applying the arm 372 to either the support bars 146 or the feet 147. Numerous variations will now be readily apparent to those skilled in the art, as well as variations for different styles of grids not depicted herein. Further, attachment to other grid types as described above would permit centering of the guide member on the path of travel.

Turning back to the figures, FIGS. 10a–10d show more details of the guide 370. The pocket 374 is generally defined by two opposing side walls 375 that are preferably integrally formed with the arm 372. Opposing front and rear walls 376 further define the limits of the pocket 374, and in the illustrated embodiment are formed from the upper surface of the arm 372 that is removed to define an entrance opening to the pocket 374. A bottom wall 377 is formed to retain the guide member 390, the wall 377 preferably being integrally formed with the side walls 375.

The illustrations show use of a coil spring 380 in the bottom of the pocket 374 urging the magnet assembly 390 upwardly toward the pan. As will be made clear by the next embodiment, a spring bias mechanism is not essential, and the spring 380 can be eliminated, relying solely on the attraction of the magnet assembly to the pan to raise the magnet assembly to its operative position. When the spring is used, the construction best shown in FIG. 10d is suitable for assembly. As shown in that figure, tabs extend upwardly from the bottom wall 377 to retain the spring 380. The spring 380 biases the guide member 390 to a neutral position raised above the support surface. The side walls 375 are formed with slots 378 which receive a selectively attachable peg (not shown) attached to the cover 394 of the guide member 390. The peg and slots 378 limit the vertical movement of the guide member 390 and prevent it from being pulled out of the pocket 374. The bottom wall 377 and spring 380 also restrict the movement of the guide member 390 down into the pocket 374.

FIGS. 10e–10h are similar to FIGS. 10a–10d, but show the guide member 390 in its lowered position. In the lowered position, the upper surface of the guide member 390 is positioned at about the support surface S. It can be seen that the spring 380 has been compressed, and the guide member 390 has moved downwardly further into the pocket 374. The spring thus provides an upward force to the guide member 390, but the force is not greater than the weight of a pan so that the pan will always be positioned on the support surface.

Turning now to FIGS. 11a–11f, there is shown yet a further embodiment of the invention, currently believed to be the preferred embodiment. The embodiment is like the others in that it provides a centerguide magnet having vertical movement to engage the underside of a pan in such a way as to guide the pan and maintain its orientation during conveyor travel. The centerguide is readily attached to the grid by means of a foldable tab structure which engages the grid structure, so that assembly or removal of the centerguide structure is relatively easily accomplished. Furthermore, the embodiment simplifies the prior constructions in that no spring bias is necessary, and the force of the magnet serves as the mechanism for attracting the magnetic centerguide to the underside of the pan.

Turning in greater detail to FIGS. 11a–11f, the grid, like many of the other embodiments, includes a grid mounting plate 444 attached to a pendant plate 442 which connects to the conveyor link. In the illustrated embodiment a pair of transverse support bars 446 are affixed as by welding to the grid mounting plate 444. A second support bar 450 is fixed to the transverse support bars 446 and provides a support surface S on which the pans rest. The support surface provided by the grid 450 is generally horizontal and is preferably defined by the illustrated W-shaped grid which includes several straight portions 452 extending generally parallel to the path of travel connected by U-shaped portions 454.

For mounting the magnetic centering guide to the grid, a centerguide mounting structure 410 is provided which supports a magnet assembly 490. The support structure 410 is of non-magnetic material, such as non-magnetic steel. It provides a pocket 411 in which the magnet assembly 490 can raise and lower. Extending outwardly from the pocket are a pair of horizontal sections 412 which terminate in bendable tab members 413 and 414. The tab members 413 engage the straight sections 452 of the W-shaped grid bar 450 whereas the tab members 414 engage one of the transverse support bars 446. The tabs can be crimped in place using a special tool or using ordinary hand tools. To install the magnetic centerguide it is only necessary to position the centerguide over the grid as illustrated in the drawings and to crimp the tabs 413, 414 over the underlying grid portions. It will be apparent this centerguide construction is thus suitable for both new and retrofit installations.

Figure 11C:
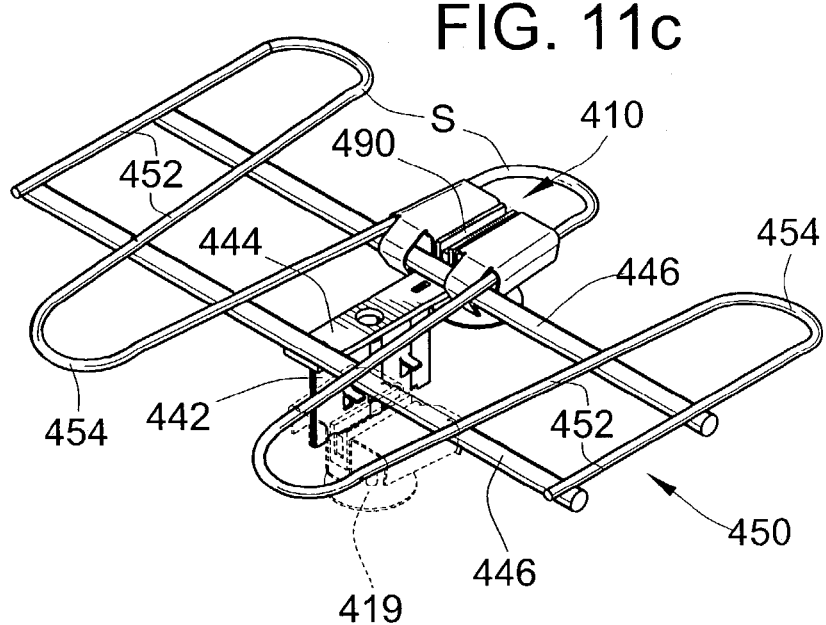
Figure 11D:
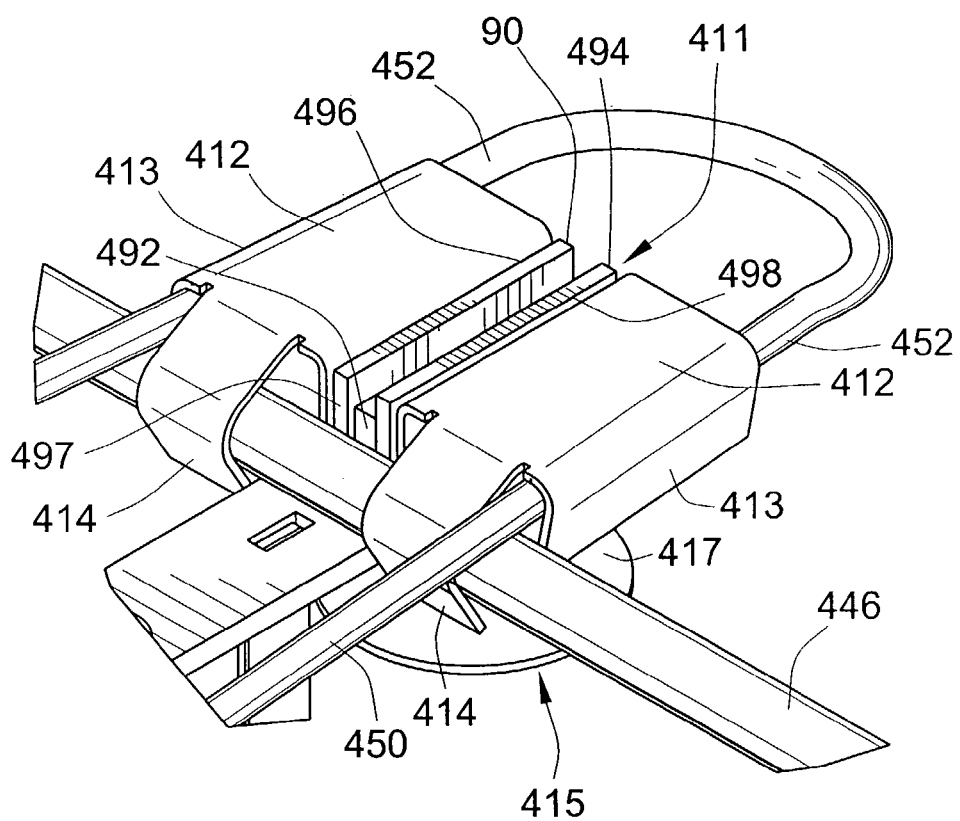
Figure 11E:
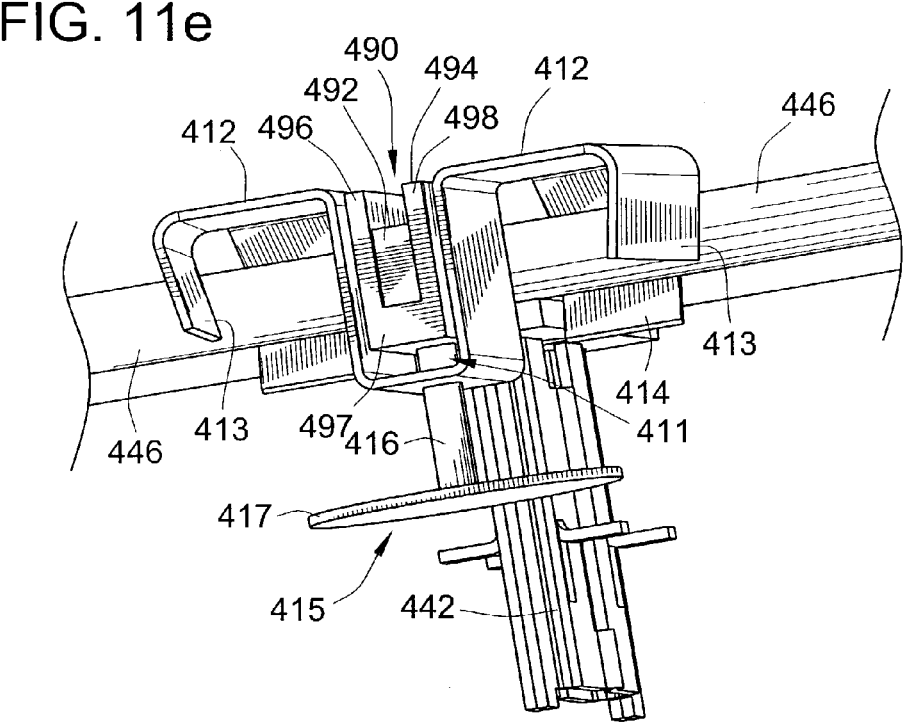
Figure 11F:
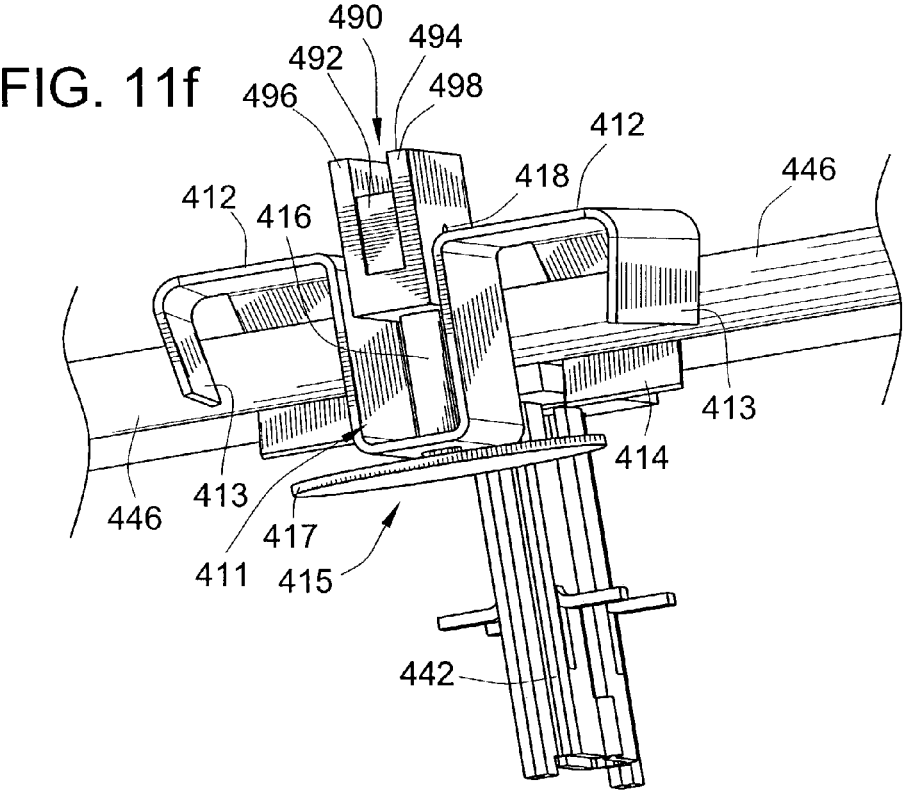

The pocket 411 in which the magnet assembly 490 rides is best illustrated in FIGS. 11e and 11f. It will be seen that the magnet assembly 490 is constructed much like the magnet assembly of the FIG. 1 embodiment to include a magnet 492 riding in a carrier 494. The carrier 494 has two high permeability legs 496, 498 joined by a lower bridging member 497 of low permeability material. The magnet 492 fits within the slot between the legs 496, 498 and is pinned in place by a non-magnetic pin 418. The pin allows the magnet to rotate slightly within the carrier and also prevents the magnet from being removed from the carrier. A base member 415 has an upwardly extending post 416 which fits within the bridge member 497 of the magnet assembly 490. The post 416 can be affixed to the carrier by way of a press fit, or by adhesive or the like. Carried on the bottom of the post 416 is a stop member 417 which as best illustrated in FIG. 11f engages the underside of the assembly 410 to limit the upward movement of the magnet. In the illustrated embodiment the stop member 417 contacts the underside of the pocket 411. Thus the magnet can raise no farther than it is allowed by the length of the post 416. If the inter-pocket gap into which the magnet rises is deeper than is allowed by the travel of the magnet stop, the magnet will stay in its raised position and adhere to one of the edges of the trough as has been previously described. In addition, the stop prevents the magnet from being removed from the magnet assembly 410 when the pan is removed from the grid.

The illustrated embodiment shows the use of no spring bias force for biasing the magnet into an operative position. As shown in FIGS. 11c and 11d, the lowermost position of the magnet is established such that the operative upper surface of the magnet assembly is just below the support surface S on which the pan bottom rides. The magnet is of sufficient strength that when a pan is placed on the support surface S, the magnetic attraction caused by the magnet is sufficient, without the need for additional spring bias, to raise the magnet assembly 490 in its pocket so that the centerguide magnet then engages the pan. As in the previously illustrated embodiments, the engagement is typically between pockets, but even if that idealized and preferred case is not achieved, the magnet will engage the pan at a single place with sufficient force and sufficiently near the centerline to maintain the orientation of the pan as the conveyor progresses around the multiple loops it is intended to travel. FIG. 11c also illustrates a position for a secondary centerguide assembly 419 which can be included in certain circumstance, such as for use with pans having an asymmetrical trough structure, or in cases where large pans span multiple grids.

Having reviewed the numerous embodiments of the invention, it can be seen that the invention is broad and primary in character. The invention provides a universal centering guide that is adaptable to all different types of product supports such as baking pans. Generally, the centering guide includes a guide member that automatically adjusts its position to fit the profile of any particular pan. The guide member includes a magnet that assists in retaining the pan to the grid. Preferably, the magnet has a full contact strength of at least 70 lbs, preferably about 80 lbs. This strength of the magnet ensures that the pan, once attached to the grid by the centering guide, will not move relative to the magnet and hence the grid unless desired, i.e. when a known lifting force is applied to the pan to remove the pan from the grid after processing. Since the pan and magnet do not move horizontally relative to the grid, and since the centerguide is very near the centerline of travel of the grid, the system reliably maintains the orientation of pans on the grid as the conveyor traverses both straight and curved sections of its track. In some embodiments, spring assist is provided to assist the magnet in engaging a pan once placed on the grid. In other more simplified embodiments, even the spring is not needed, and the magnet itself is adequate to raise from its rest position to its active guiding position once the pan is put in place, based on the magnetic attraction to the pan.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A magnetic centerguide for a grid structured for travel along a path of a conveyor, the grid defining a support surface that supports a pan, the magnetic centerguide comprising in combination:
   a guide member including a magnet and having an upwardly facing portion magnetically attractable to the underside of a pan when placed on the grid;
   a guide support carrying the guide member and supporting it with respect to at least two operative positions determined by the position of a pan on the grid, a first position at or below the support surface when a pan is supported on the grid with a pocket disposed over the guide member, and a second position substantially above the support surface for contact in a trough of a pan supported on the grid; and
   the guide support being attached to the grid in such a way that engagement of the guide member with the pan during travel of the grid along the path of the conveyor maintains the orientation of the pan supported on the grid.

2. A magnetic centerguide for a grid structured for travel along a path of a conveyor, the grid defining a support surface that supports a pan, the magnetic centerguide comprising in combination:
   a guide member including a magnet and having an upwardly facing portion magnetically attractable to the underside of a pan when placed on the grid;
   a guide support connected to the grid and carrying the guide member in such a way that the guide member can raise to a plurality of operative positions at or above the support surface to engage the underside of a pan when supported on the grid to maintain the orientation thereof.

3. A guide assembly for a grid structured for travel along a path of a conveyor, the grid defining a support surface that supports a pan, the guide assembly comprising:
   a guide member mounted to the grid, the guide member including a magnet having an operative upper surface; and
   the guide member being mounted for movement of the magnet with respect to the support surface in a vertical direction and within a range including
      a) a first position where the upper surface is above the support surface, and
      b) a second position where the upper surface is at or below the support surface.

4. Tho guide assembly of claim 3, wherein the guide member is centered on the path of travel.

5. The guide assembly of claim 3 including a guide support connected to the grid and carrying the guide member, the guide support having a pocket carried by the grid and having an opening in the top thereof, the guide member being mounted in the pocket for vertical movement through the opening.

6. The guide assembly of claim 5 including a spring in the pocket biasing the guide member into the opening.

7. The guide assembly of claim 6 including a retaining mechanism for connecting the guide member to the pocket.

8. The guide assembly of claim 5 including a retaining mechanism for connecting the guide member to the pocket.

9. The guide assembly of claim 8 wherein the retaining mechanism includes a post supporting and guiding the movement of the guide member in the pocket, and a stopper attached to the post for preventing removal of the guide member from the pocket.

10. The guide assembly of claim 9 wherein the guide member includes a yoke having two magnetically permeable upstanding walls embracing the magnet for concentrating the flux thereof.

11. The guide assembly of claim 5 wherein the guide support includes an attachment structure carrying the pocket and having foldable tab members for attachment to the grid.

12. The guide assembly of claim 10 wherein the guide support includes an attachment structure carrying the pocket and having foldable tab members for attachment to the grid.

13. The guide assembly of claim 5 wherein the guide member and pocket are arranged such that placing of a metal pan on the support surface attracts the guide member to the pan using magnetic force.

14. The guide assembly of claim 3 including a guide support connected to the grid and carrying the guide member, the guide support including a mechanical spring biasing the guide member to a neutral position.

15. The guide assembly of claim 14, wherein the neutral position is below the first position but above the support surface.

16. The guide assembly of claim 14, wherein the bias of the spring provides a force less than a weight of the pan.

17. The guide assembly of claim 14, wherein the spring is a flat spring connected between a grid mounting plate and the guide member.

18. The guide assembly of claim 14, wherein the spring is a coil spring.

19. The guide assembly of claim 14, wherein the spring is a spring arm having one end connected to the grid and a second end carrying the guide member.

20. The guide assembly of claim 3, wherein the guide member is positioned on a forward half of the grid.

21. The guide assembly of claim 3, wherein the magnet of the guide member has a full contact strength of at least 70 lbs.

22. The guide assembly of claim 3, wherein the guide member is connected to the grid by a spring arm.

23. The guide assembly of claim 22, wherein the spring arm is attached to the grid at one end and to the guide member at a second end to provide vertical movement to the guide member.

24. The guide assembly of claim 22, wherein the spring arm is constructed of a resilient material to deflect and provide vertical movement to the guide member.

25. The guide assembly of claim 22, wherein guide member is pivotally attached to the spring arm.

26. The guide assembly of claim 25 wherein the spring arm is a flat spring having a first end connected to a grid mounting plate and a second end carrying a flange for connection to the guide member.

27. The guide assembly of claim 25 wherein the spring arm has a first end formed into a coil for connection to the grid and a second end formed into a mounting feature for connection to the guide member.

28. The guide assembly of claim 27 wherein the guide member comprises a yoke having two magnetically permeable upstanding walls embracing the magnet, and the magnet has a rectangular configuration.

29. The guide assembly of claim 27 wherein the magnet is cylindrical and is connected to the mounting feature of the spring arm.

30. A guide assembly for a grid structured for travel along a path of a conveyor, the grid defining a support surface that supports a variety of pans having varying numbers of pockets, the guide comprising:
  a magnet mounted to the grid for vertical movement relative to the support surface, the magnet having an upwardly facing contact area for gripping a pan, the range of movement being sufficient to position the contact area
    a) adjacent the support surface for contacting an underside of a pocket when a pocket is positioned above the magnet; and
    b) above the support surface for contacting an underside of a pan at a position between pockets when the pockets are positioned to the side of the magnet.

31. The guide assembly of claim 30, wherein the magnet is connected to the grid by a spring arm, which deflects to position the guide member above, at, or below the support surface.

32. The guide assembly of claim 30, wherein the magnet is received within an open-topped pocket, the magnet being vertically moveable in the pocket.

33. The guide assembly of claim 32, wherein the pocket includes a spring supporting the magnet.

34. A guide assembly for a grid structured for travel along a path of a conveyor, the grid defining a support surface that supports a pan, the pan having a plurality of pockets separated by inter-pocket gaps, the guide assembly comprising:
  a magnet mounted to the grid for gripping a pan;
    the magnet having a width less than the width of an inter-pocket gap; and the magnet mounted to the grid at a position centered on the pat of travel.

35. The guide assembly of claim 34, wherein the magnet is vertically movable relative to the support surface.

36. The guide assembly of claim 35, wherein the magnet is connected to the grid by a spring arm.

37. The guide assembly of claim 34 wherein the magnet rides in a pocket carried by the grid.

38. A grid assembly for supporting a pan on a conveyor defining a path of travel, the grid assembly comprising:
  a grid mounting plate structured for attachment to the conveyor;
  a grid structure attached to the grid mounting plate and defining a support surface for supporting the pan; and
  a centerguide assembly attached to the grid mounting plate, the centerguide assembly including a magnet mourned for vertical movement relative to the support surface for contact with the underside of a pan supported on the support surface, the magnet being mounted over the conveyor for maintaining the orientation of the pan as it travels along the path.

39. The grid assembly of claim 38, wherein guide includes a guide arm adjustable relative to the grid mounting plate to provide vertical movement to the magnet.

40. The grid assembly of claim 39, wherein the guide arm is a mechanical spring.

41. The grid assembly of claim 38, wherein the centerguide includes a guide mounting plate attached to the grid mounting plate.

42. The grid assembly of claim 38, wherein the magnet is pivotally mounted to a spring arm connected to the grid mounting plate.

43. A centerguide for a grid structured for travel along a path of a conveyor, the grid defining a support surface that supports different types of pans, a first pan type having a centerline aligned with a column of pockets, a second pan type having a centerline positioned between columns of pockets, the guide comprising:
  a magnet mounted to the grid at a position centered on the path of travel, the magnet mounted for vertical movement relative to the support surface for contact with the underside of a pan on the support surface;
  the magnet taking a first position below the support surface for the first pan type; and
  the magnet taking a second position above the support surface for the second pan type.

44. A guide for a grid structured for travel along a path of a conveyor, the grid defining a support surface that supports different types of pans having different pan profiles, the guide comprising:
  a magnetic guide member attached to the grid for vertical movement relative to the support surface; and
  the guide member positioned for magnetic attraction to a pan placed on the grid, the guide member automatically adjusting its vertical position to accommodate the profile of the pan.

45. A guide assembly for a grid structured for travel along a path of a conveyor, the grid defining a support surface arranged and constructed to support a pan, the guide assembly comprising:
a magnetic guide member connected to the grid; and
the magnetic guide member positioned above the support surface in a neutral position, the guide member being arranged for vertical movement above and below the neutral position.

46. The guide assembly of claim 45, wherein the magnetic guide member is centered on the path of travel.

47. The guide assembly of claim 45, including a spring interposed in the connection between the guide member and the grid, the spring being arranged to establish the neutral position.

48. The guide assembly of claim 45, wherein the magnetic guide member is connected to the grid by a spring arm.

49. The guide assembly of claim 48, wherein the spring arm deflects to position the guide member above, at, or below the support surface.

50. The guide assembly of claim 48, wherein the spring aim is attached to the grid at a position below the support surface.

51. The guide assembly of claim 49, wherein the spring arm comprises a left arm and a right arm that are independently adjustable in the vertical direction.

52. The guide assembly of claim 48, wherein to guide member is pivotally mounted to the spring arm.

53. A guide assembly for a grid structured for travel along a path of a conveyor, the grid defining a support surface for a pan, the guide assembly comprising:
a spring arm having a first end attached to the grid and a second end configured as a mounting surface;
a guide member attached to the spring arm at the mounting surface, the guide member having a neutral position above the support surface and centered on the path of travel; and
the guide member including a magnet positioned to be attracted to a pan when positioned on the support surface.

54. The guide assembly of claim 53 wherein the spring arm includes two spring legs attached to a guide mounting plate, the guide mounting plate being attached to the grid.

55. The guide assembly of claim 54 wherein the guide member includes a yoke supporting the magnet, the yoke being pivotably mounted to the mounting surface.

56. The guide assembly of claim 53 wherein the spring arm includes a pair of spring wires having first ends coiled for attachment to the grid and the mounting surfaces being formed at a second end of said spring wires.

57. The guide assembly of claim 56 wherein the guide member includes a yoke supporting the magnet, the yoke being pivotably mounted to the mounting surface.

58. The guide assembly of claim 56 wherein the magnet is cylindrical, and the guide member includes an attachment point for connection to the mounting surface.

59. A guide assembly for a grid structured for travel along a path of a conveyor, the grid defining a support surface for a pan, the grid assembly comprising:
a guide support attached to the grid and having an open-top pocket formed therein;
a guide member including a magnet, the guide member being mounted in the pocket for vertical movement; and
means for causing the guide member to contact the underside of a pan when placed on the support surface.

60. The guide assembly of claim 59 wherein the means for causing includes a magnet of sufficient strength to draw the magnet upwardly in the pocket to contact the pan.

61. The guide assembly of claim 59 wherein the means for causing includes a spring biasing the guide member upwardly and a magnet for thawing the spring biased guide means to the pan.

62. The guide assembly If claim 60 wherein the guide member is centered on the path of the conveyor.

63. A grid assembly for carrying a pan on a conveyor defining a path of S travel, the grid assembly comprising:
a grid, mounting plate structured for attachment to the conveyor;
a first support bar attached to the grid mounting plate;
a second support bar attached to and extending across the first support bar to define a support surface for supporting the pan;
a guide member attached to one of the support bars and positioned above the support surface to assist in retaining a pan on the grid assembly,
the guide member including a magnet mounted for vertical travel in a range sufficient to contact and attach to the underside of pans of a plurality of configurations when placed on the support surface.

64. The grid assembly of claim 63, wherein the guide member is centered on the path of travel.

65. The grid assembly of claim 63, wherein the guide member is attached to the first support bar by a support arm.

66. The grid assembly of claim 65, wherein the support arm is a mechanical spring.

67. The grid assembly of claim 65, wherein the support arm includes a left and right arm.

68. The grid assembly of claim 65, wherein the support arm is coiled around the first support bar.

69. The grid assembly of claim 68, wherein the coil includes rings that straddle the second support bar.

70. A method for retaining different types of pans on a support surface of a grid structured for travel along a path of a conveyor, a first pan type having a centerline aligned with a column of pockets, a second pan type having a centerline positioned between columns of pockets, the method comprising:
mounting a magnet to a grid for vertical movement relative to the support surface at a position centered on the path of travel;
positioning the magnet at a first position below the grid surface for the first pan type; and
positioning the magnet at a second position above the support surface for the second pan type.

* * * * *